(12) United States Patent
Tatarka

(10) Patent No.: US 8,986,820 B2
(45) Date of Patent: Mar. 24, 2015

(54) THERMOFORMED ARTICLES FROM SHEET INCORPORATING CYCLOOLEFIN COPOLYMER

(75) Inventor: Paul D. Tatarka, Union, KY (US)

(73) Assignee: Topas Advanced Polymers, Inc., Florence, KY (US)

( * ) Notice: Subject to any disclaimer, the term of this patent is extended or adjusted under 35 U.S.C. 154(b) by 1970 days.

(21) Appl. No.: 12/150,482

(22) Filed: Apr. 29, 2008

(65) Prior Publication Data

US 2008/0311370 A1 Dec. 18, 2008

Related U.S. Application Data

(60) Provisional application No. 60/927,268, filed on May 2, 2007.

(51) Int. Cl.
*B32B 27/32* (2006.01)

(52) U.S. Cl.
CPC .................................... *B32B 27/32* (2013.01)
USPC ......................................... 428/212; 428/220

(58) Field of Classification Search
CPC ..................................................... B32B 27/32
USPC ................................................ 428/212, 220
See application file for complete search history.

(56) References Cited

U.S. PATENT DOCUMENTS

| | | | |
|---|---|---|---|
| 5,583,192 A | 12/1996 | Bennett et al. | 526/348.1 |
| 6,042,906 A | 3/2000 | Itoh et al. | 428/35.2 |
| 6,111,019 A * | 8/2000 | Arjunan et al. | 525/211 |
| 6,255,396 B1 | 7/2001 | Ding et al. | 525/191 |
| 6,329,047 B1 | 12/2001 | Beer et al. | 428/215 |
| 6,488,972 B1 * | 12/2002 | Cerani | 426/110 |
| 6,641,925 B1 | 11/2003 | Beer et al. | 428/518 |
| 6,790,577 B1 * | 9/2004 | Nakamura | 430/109.3 |
| 6,811,857 B1 | 11/2004 | Bravet et al. | 428/192 |
| 6,998,169 B1 | 2/2006 | Bravet et al. | 428/215 |
| 7,101,611 B2 | 9/2006 | Bravet et al. | 428/215 |
| 2006/0020084 A1 * | 1/2006 | Heukelbach et al. | 525/191 |
| 2006/0198987 A1 * | 9/2006 | Grob et al. | 428/137 |

FOREIGN PATENT DOCUMENTS

DE 20116341 U1 2/2002 ............. B32B 27/32

OTHER PUBLICATIONS

Lamonte, R. "Stiffer, Thinner Packaging Films with Improved Sealing Using Cyclic Olefin Copolymers", 10th Worldwide Flexible Packaging Conference, Amsterdam (Nov. 2000); and "Optimization of Wall Thickness Distribution of Pharmaceutical Press—Through Blisters", Wolf, J. et al., Institute for Plastics Processing (IKV), Aachen, Germany, ANTEC, 1999.
JL Throne, Thermoforming, Hanser ( Munich1987), pp. 13-38.
Highline Online Brochure (2013), 4 pages.
Wikipedia Online Encyclopedia, Plastics Extrusion, (2013) 8 pages.

* cited by examiner

*Primary Examiner* — Aaron Austin
*Assistant Examiner* — Lawrence Ferguson
(74) *Attorney, Agent, or Firm* — Michael W. Ferrell

(57) ABSTRACT

Thermoformed articles include cycloolefin/ethylene copolymer and LLDPE. The articles are formed with an areal draw ratio of 1.5 and greater and exhibit unexpectedly elevated stiffness along with ductility suitable for forming deep-draw parts. Multilayer sheet is used for achieving a desired set of properties.

23 Claims, 8 Drawing Sheets

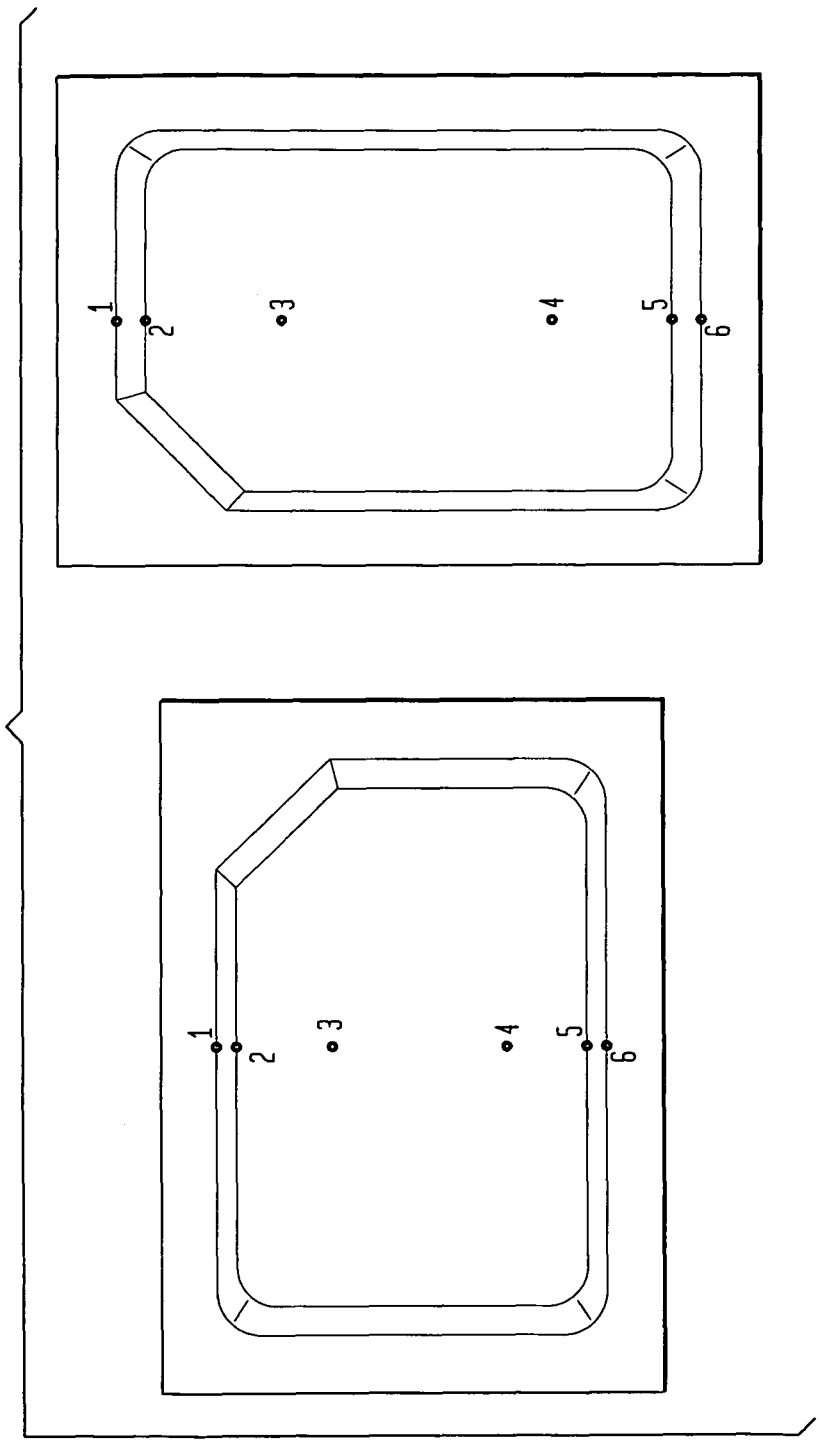

THERMOFORMED ARTICLES FROM SHEET INCORPORATING CYCLOOLEFIN COPOLYMER

CLAIM FOR PRIORITY

This application is based upon U.S. Provisional Patent Application Ser. No. 60/927,268, filed May 2, 2007 of the same title. The priority of U.S. Provisional Patent Application Ser. No. 60/927,268 is hereby claimed and the disclosure of which is hereby incorporated by reference into this patent application in its entirety.

TECHNICAL FIELD

The present invention relates to thermoformed articles made from thermoformable sheet which includes cycloolefin copolymer. In one aspect, a sheet with at least one layer incorporating cycloolefin copolymer and LLDPE is utilized to produce articles with unexpectedly superior stiffness, puncture resistance, shrink resistance and processability in "deep draw" thermoforming. The articles have superior barrier and optical properties so as to be useful for packaging moisture and oxygen sensitive products such as pharmaceuticals, medical implements, electronic hardware, food products and so forth.

BACKGROUND

Cycloolefin copolymer or "COC" is a relatively new commercial polymer. Four commercial sources are available under the TOPAS®, Apel™, Zeonor™ and Zeonex®, and Arton™ product names, supplied by Topas Advanced Polymers, Mitsui Chemicals, Zeon Chemical and Japan Synthetic Rubber. Commercial COC is typically a random copolymer of ethylene and norbornene. Norbornene is synthesized via Diels-Alder reaction of ethylene and cylopentadiene. Polymerization of ethylene and norbornene using metallocene catalysts produces cyclic olefin copolymer. Large bulky cyclic rings randomly distributed in a polyethylene backbone prevent crystallization of the ethylene, creating an amorphous morphology.

COC grades are distinguished by glass transition temperature (Tg) and molecular weight. The glass transition temperature depends on the mole percent of norbornene. Typical commercial Tg range is between 68 and 170° C. COC has many key property attributes, including but not limited to exceptional moisture and aroma barrier, chemical resistance, transparency, purity, stiffness and strength. U.S. Pat. No. 6,255,396 to Ding et al. discloses polymer blends for making films including cycloolefin copolymers and linear low density polyethylene (LLDPE). Additionally, LLDPE blends with an ethylene-norbornene copolymer are disclosed in U.S. Pat. No. 6,111,019 of Arjunan et al. Oriented film of similar composition is seen in U.S. Pat. No. 5,583,192 of Bennett et al. Cycloolefin copolymer layers have been used in multilayer articles, such as a flavor retaining multilayer plastic container disclosed by Itoh et al. in U.S. Pat. No. 6,042,906. See also Lamonte, R. "Stiffer, Thinner Packaging Films with Improved Sealing Using Cyclic Olefin Copolymers", $10^{th}$ Worldwide Flexible Packaging Conference, Amsterdam (November 2000) as well as "Optimization of Wall Thickness Distribution of Pharmaceutical Press-Through Blisters", Wolf, J. et al., Institute for Plastics Processing (IKV), Aachen, Germany, ANTEC, 1999.

Thermoformable composite films which include a cycloolefin copolymer are seen in U.S. Pat. No. 6,329,047 to Beer et al. as well as U.S. Pat. No. 6,641,925 also to Beer et al. The composite film of these patents includes a cycloolefin copolymer layer and a polyvinylidene chloride (PVDC) layer. The thermoformable composite film is proposed for blister packs. See also Gebranchsmusterschrift DE 20116341 U1.

The following patents all to Bravet et al. disclose a transparent window formed of cycloolefin copolymer and a scratch resistant layer: U.S. Pat. Nos. 7,101,611; 6,998,169; and 6,811,857.

Despite advances in the art, there exists a need for thermoformed articles which have high stiffness and strength, superior optical and barrier properties, and processability as characterized by low gauge variation and resistance to shrinkage. Processing and product issues become particularly acute when trying to form so called "deep-draw parts" where ductility of the sheet is a salient feature.

SUMMARY OF INVENTION

There is provided in one aspect of the invention a thermoformed article prepared from a sheet with relatively elevated stiffness as well as ductility suitable for deep-draw thermoforming including linear low density polyethylene (LLDPE) and cycloolefin/ethylene copolymer, the cycloolefin copolymer being present in an amount of from about 5 weight percent to about 45 weight percent. The sheet has a thickness of from about 3 mils to about 20 mils and exhibits a relative machine direction (MD) modulus of at least 2 as compared to the LLDPE in the sheet as well as a relative MD elongation of greater than 0.5 as compared with the LLDPE in the sheet. The thermoformed article is further characterized by having an areal draw ratio of at least 1.5 with respect to the sheet from which it is formed.

In another aspect of the invention, there is provided a multilayer, thermoformed article prepared from a multilayer sheet of a thickness of from about 3 mils to about 20 mils, the multilayer sheet comprising at least one discrete layer which is predominantly LLDPE and at least one adjacent discrete layer which is predominantly cycloolefin/ethylene copolymer. The sheet exhibits a relative MD modulus of at least 2 as compared to the LLDPE in the sheet.

The thermoformed articles and the sheet from which they are made exhibit superior barrier properties, mechanical properties, optical properties and processability so as to be suitable for packaging pharmaceuticals, medical implements such as suture kits, filled syringes and the like, electronic hardware, food products and so forth.

Advantages and features of the invention are appreciated form FIGS. 1-6, which are "spider" graphs illustrating sheet and thermoformed part properties. FIG. 1 shows sheet and thermoformed article properties of 12 mil LDPE/ionomer/LDPE product with 6 mil multilayer sheet product as compared with of the invention. The invention product has much higher modulus, making gauge reduction possible. In FIG. 2, it is likewise seen that monolayer product of the invention exhibits much higher modulus than LDPE/ionomer/LDPE product.

FIG. 3 compares 6-mil PP/LDPE/PP product with 4.7 mil product of the invention. The invention product has equivalent mechanical properties, including somewhat higher stiffness and tensile strength. The invention product also exhibits much lower gauge variation, indicative of better processability as well as much less haze.

In FIG. 4 it is seen that the monolayer sheet of the invention compares favorably with 5 layer PE/Tie/PA/Tie/PE products, while in FIG. 5 it is seen that multilayer products of the invention have substantially more stiffness than PE/PA multilayer sheet.

FIG. 6 again illustrates that gauge reduction is readily achieved with the present invention. Monolayer product of the invention having a 4.7 mil gauge compares favorably with 6-mil LDPE/ionomer/LDPE product.

Further aspects and advantages of the present invention will become apparent from the discussion which follows.

BRIEF DESCRIPTION OF DRAWINGS

The invention is described in detail below with reference to the following drawings wherein:

FIG. 8 is a view in perspective of a thermoformed article of the present invention.

DETAILED DESCRIPTION

Figure 1:
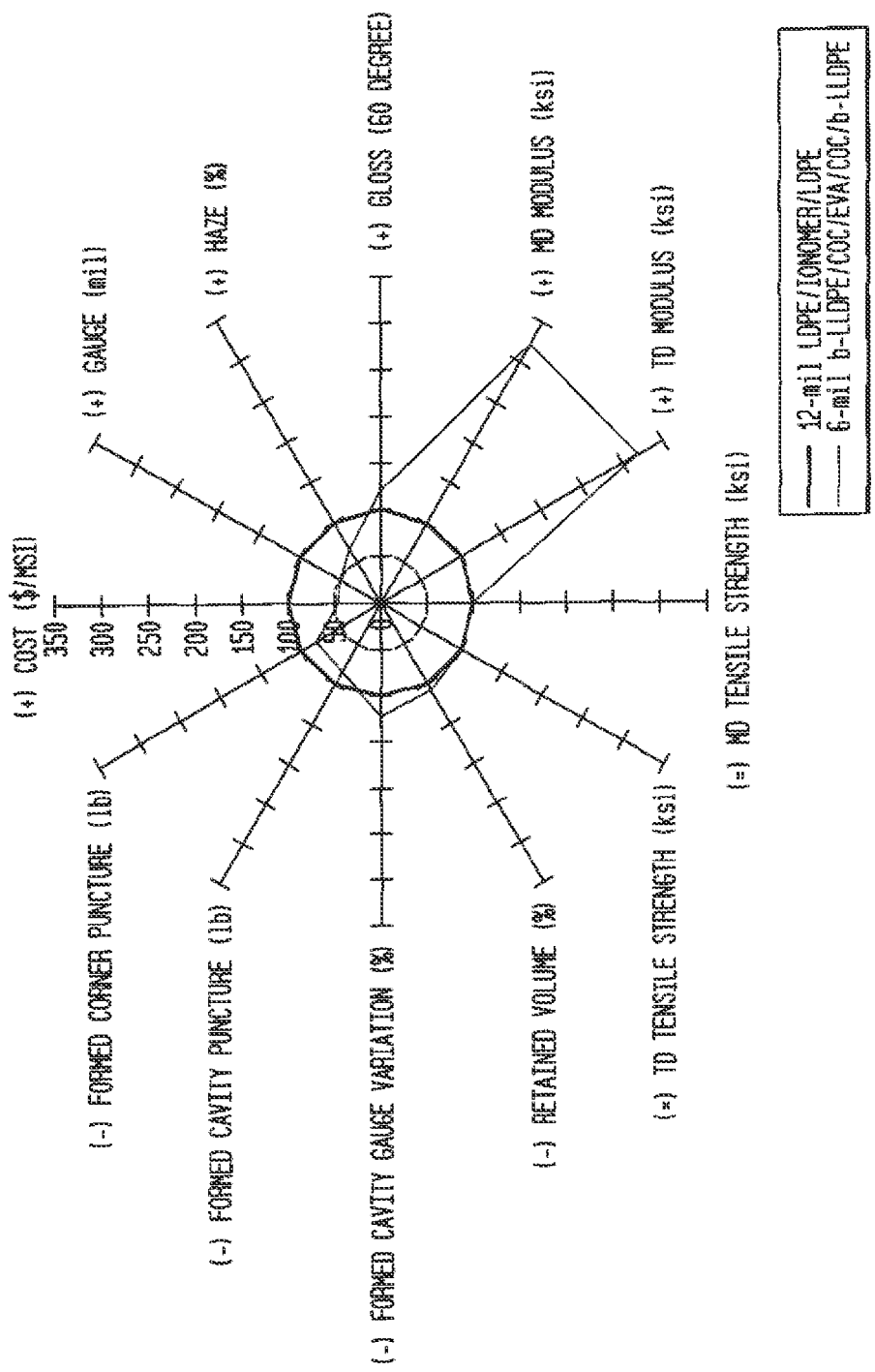
FIG. 1 is a spider graph of 12-mil LDPE/Ionomer/LDPE (Control D) vs. 6-mil b-LLDPE/COCE/EVA/COCE/b-LLDPE (Example 8)
Figure 2:
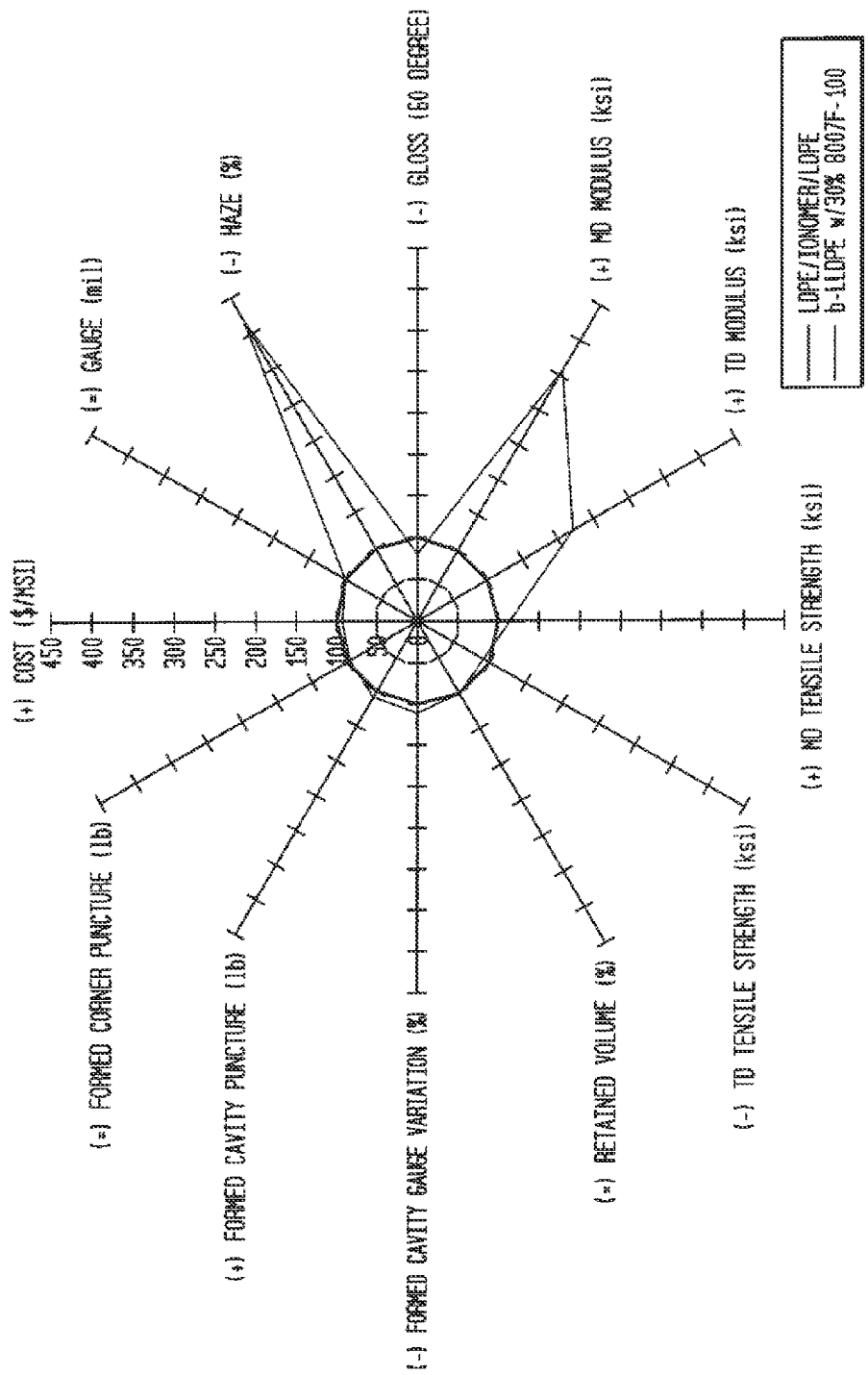
FIG. 2 is a spider graph of a LDPE/Ionomer/LDPE (Control C) vs. b-LLDPE w/30% 8007F-100 (Example 7)
Figure 3:
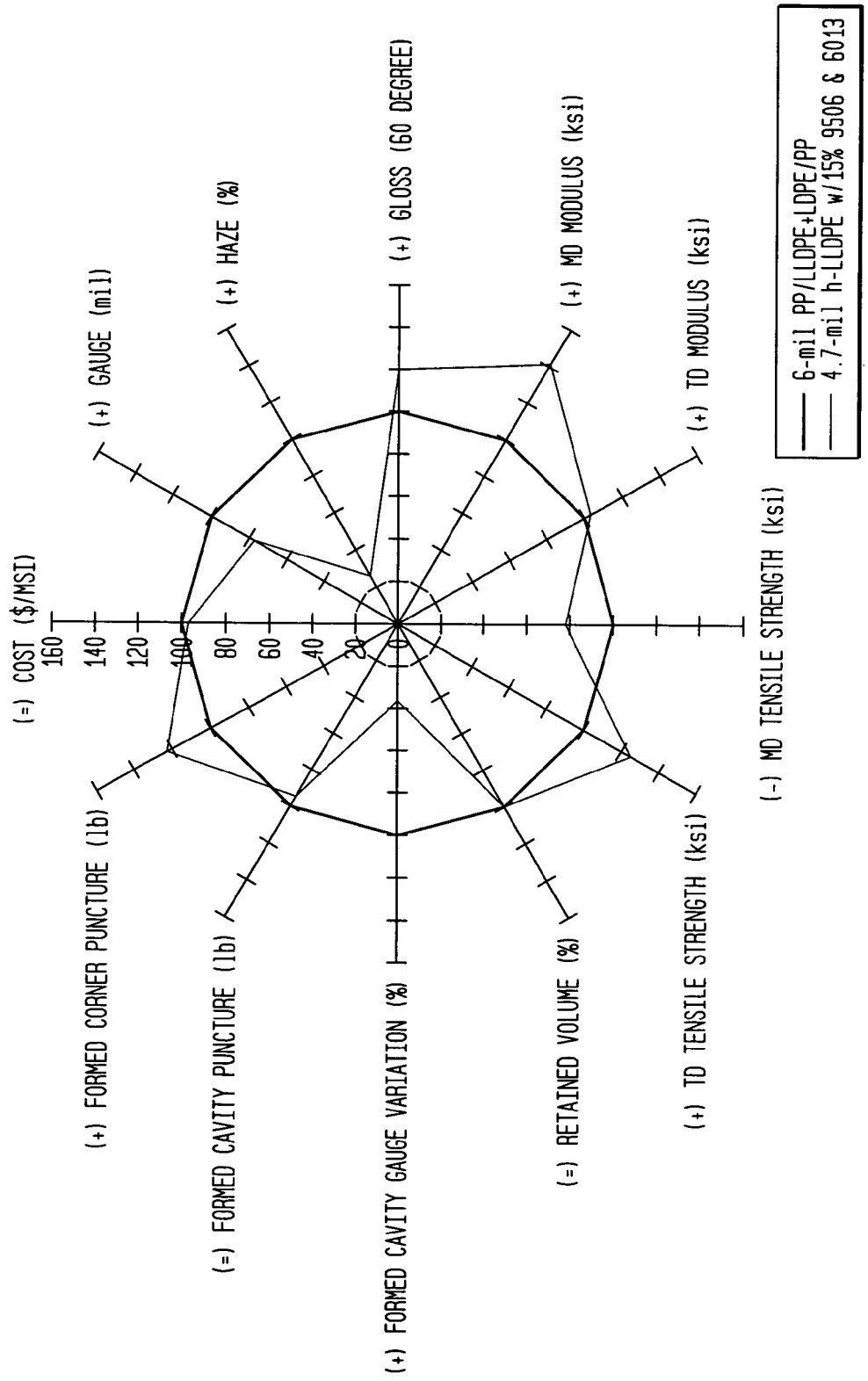
FIG. 3 is a spider graph of 6-mil PP/LLDPE+LDPE/PP (Control E) vs. 4.7 mil h-LLDPE w/15% 9506 & 6013 (Example 2)
Figure 4:
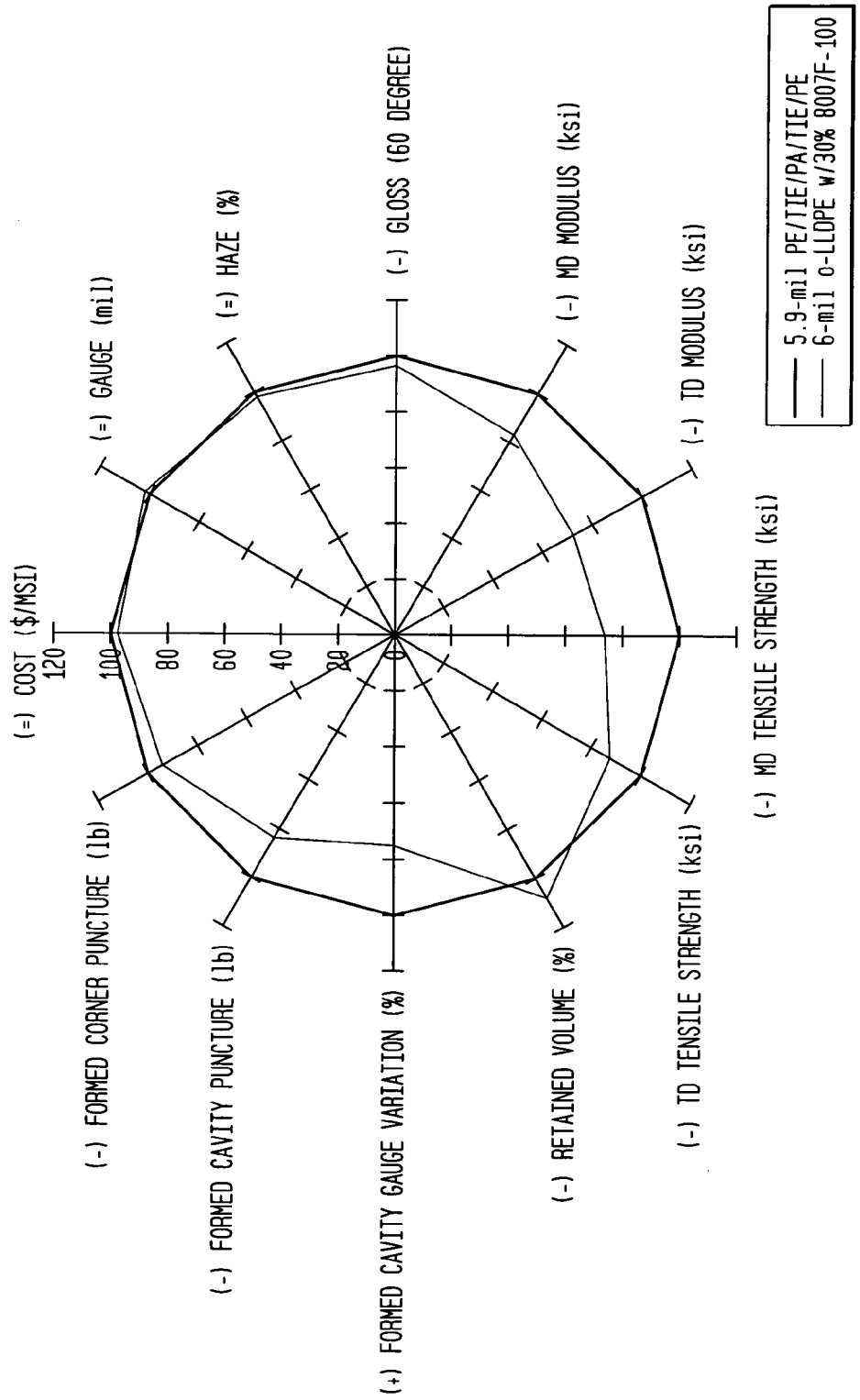
FIG. 4 is a spider graph of 5.9-mil PE/Tie/PA/Tie/PE6-mil (Control F) vs. o-LLDPE w/30% 8007F-100 (Example 7)
Figure 5:
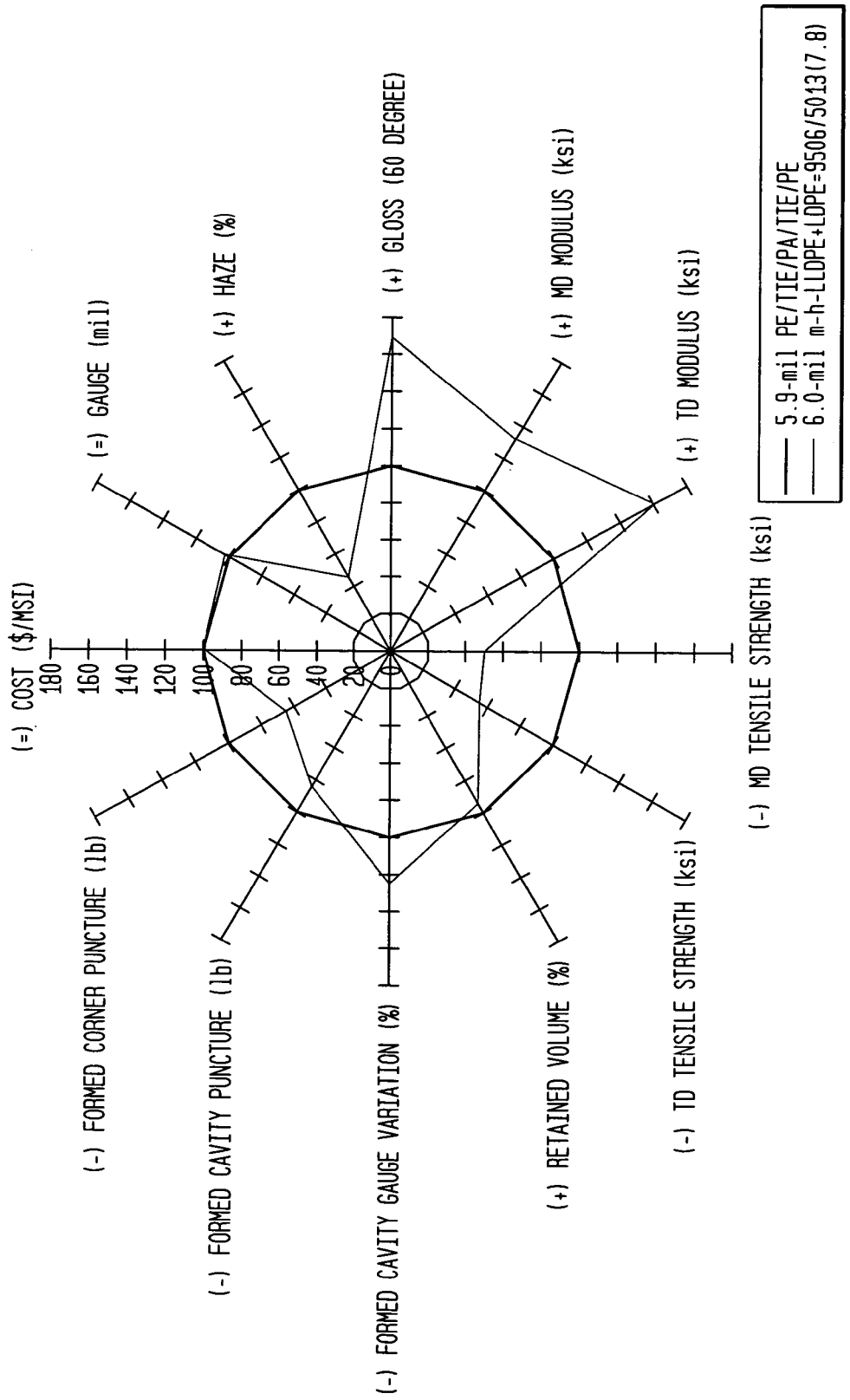
FIG. 5 is a spider graph of 5.9-mil PE/Tie/PA/Tie/PE (Control E) vs. 6.0-mil m-h-LLDPE+LDPE+9506/5013 (Example 5)
Figure 6:
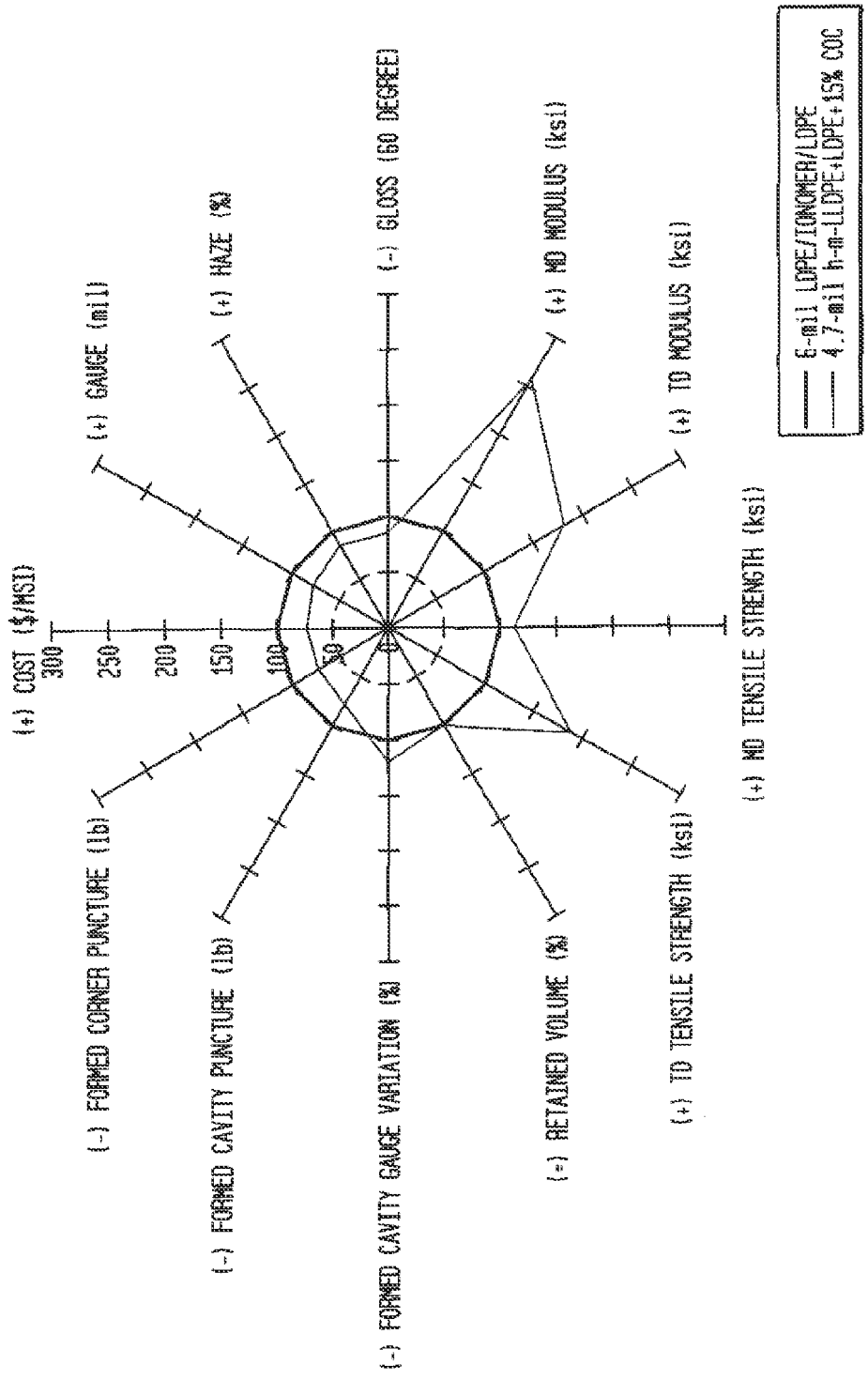
FIG. 6 is a spider graph of 6-mil LDPE/Ionomer/LDPE (Control C) vs. 4.7-mil h-m-LLDPE+LDPE+15% 9506 & 6013 (Example 2)

The present invention is described in detail below with reference to the various examples. Modifications to particular examples within the spirit and scope of the present invention, set forth in the appended claims, will be readily apparent to those of skill in the art.

In typical embodiments, articles are characterized by an areal draw ratio of from 1.5 to 5 with respect to the sheet and the sheet has a cycloolefin/ethylene copolymer content of from 10 weight percent to 40 weight percent, such as a cycloolefin/ethylene copolymer content of from 15 weight percent to 35 weight percent. In some embodiments, the sheet has a cycloolefin/ethylene copolymer content of at least 20 weight percent or at least 25 weight percent.

In some cases, the sheet exhibits a relative MD modulus of at least 3 as compared to the LLDPE in the sheet and in still others, the sheet exhibits a relative MD modulus of at least 4 as compared to the LLDPE in the sheet. The sheet may be a monolayer sheet consisting essentially of a blend of LLDPE and cycloolefin/ethylene copolymer or the sheet is a multilayer sheet which includes a discrete layer which is predominantly LLDPE and adjacent thereto a discrete layer which is predominantly cycloolefin/ethylene copolymer. In some embodiments, the predominantly LLDPE layer contains cycloolefin/ethylene copolymer; the predominantly cycloolefin/ethylene copolymer layer contains LLDPE and optionally the sheet contains a blend of two distinct cycloolefin/ethylene copolymers.

Among typical properties seen are that the thermoformed article exhibits a crush resistance of at least 1.25 relative to a like article formed of the LLDPE in the article or the thermoformed article exhibits a crush resistance of at least 1.75 relative to a like article formed of the LLDPE in the article. In some preferred cases, the thermoformed article exhibits a crush resistance of at least 2 relative to a like article formed of the LLDPE in the article. Additionally, thermoformed articles may exhibit a bottom puncture resistance of at least 1.25 as compared with a like article formed of the LLDPE in the sheet or the thermoformed articles may exhibit a bottom puncture resistance of at least 1.5 as compared with a like article formed of the LLDPE in the sheet. In some preferred cases, the thermoformed article exhibits a bottom puncture resistance of at least 1.75 as compared with a like article formed of the LLDPE in the sheet and the thermoformed article exhibits a bottom puncture retention of over 95%. A bottom puncture retention of over 100% or over 125% is readily achieved as is a relative corner puncture resistance of at least 1.2 as compared with a like article formed of the LLDPE in the sheet or a relative corner puncture resistance of at least 1.5 as compared with a like article formed of the LLDPE in the sheet.

Shrinkage is relatively low in that a thermoformed article frequently exhibits a retained volume of 95%, preferably 98% or greater. A haze value of 25% or less is typical, as are 60° gloss values of 80 or more or 60° gloss values of 100 or more.

Suitably, the glass transition temperature (Tg) of the cycloolefin/ethylene copolymer is at least 30° C., such as in the range of from 30° C. to 200° C.; or in the range of from 45° C. to 190° C.; or in the range of from 65° C. to 190° C.; or in the range of from 90° C. to 190° C.

A method of making a thermoformed article comprises: (a) preparing a thermoformable sheet including LLDPE and cycloolefin/ethylene copolymer, the cycloolefin copolymer being present in an amount of from about 5 weight percent to about 45 weight percent, the sheet having a thickness of from about 3 mils to about 20 miles and exhibiting relative MD modulus of at least 2 as compared to the LLDPE in the sheet as well as a relative MD elongation of greater than 0.5 as compared with the LLDPE in the sheet, and (b) thermoforming the sheet into the thermoformed article at an areal draw ratio of at least 1.5. In many cases, the sheet is thermoformed into the thermoformed article at an areal draw ratio of at least 1.75 or the sheet is thermoformed into the thermoformed article at an areal draw ratio of at least 2.

In cases where multilayer sheet is used, the sheet has at least 3 discrete layers, the sheet has at least 5 discrete layers, or the sheet has at least 7 discrete layers. Likewise, the sheet may have an even number of layers.

The sheet optionally includes a discrete low density polyethylene (LDPE) layer and 2 discrete LLDPE/LDPE blend layers adjacent thereto or the sheet includes a discrete ethylene vinyl acetate (EVA) copolymer layer. The predominantly LLDPE layer may have blended therein a cycloolefin/ethylene copolymer. The sheet may have a thermoforming window of at least 15° C., or may have a thermoforming window of at least 20° C. Optionally provided is a discrete oxygen barrier layer, such as an oxygen barrier layer consisting essentially of polyethylene vinyl alcohol (EVOH), or an oxygen barrier layer consisting essentially of polyvinylidene chlorides (PVDC), or an oxygen barrier layer consisting essentially of a nylon polymer.

The sheet may be a coextruded sheet and further include a discrete layer consisting essentially of a polymer selected from LDPE, medium density polyethylene (MDPE) and high density polyethylene (HDPE) or the sheet may be a coextruded sheet and further include a polypropylene layer.

A thermoformed article of this invention may be used in the packaging of pharmaceuticals, medical implements, electronic hardware or food products, for example.

Unless otherwise indicated, terms are to be construed in accordance with their ordinary meaning. Percent, for example, refers to weight percent, unless context indicates otherwise.

Areal draw ratio refers to the ratio of the total surface area of a part (FIG. 8) to the area of a sheet of thermoformable material from which it is formed. A thermoformed article made from a sheet of 1 m² into a thermoformed article with a total surface area of 2 m² has an areal draw ratio of 2. Areal draw ratios are further discussed below.

Relative crush resistance is determined by measuring deflection on a like part of a different material, and the relative crush resistance expressed as the inverse of the deflection ratio. A COCE-containing part exhibiting a 10 mm deflection under 1.9 lbf load has a relative crush resistance of 2 relative to a like article of LLDPE if the LLDPE part exhibits a 20 mm deflection under the same load.

A "distinct" polymer is one which has different properties. For example, two COCE polymers with different glass transitions (Tg) are distinct polymers.

"Layer" refers to a stratum of material having a lateral extent greater than its thickness. A monolayer has only 1 layer, while multilayer products have a plurality of layers of different composition, also referred to herein as discrete layers.

A "like" sheet or part of a different material has the same geometry, i.e., thickeness and shape, but is made from a different material. The part or sheet is also made in substantially the same way.

MD means machine direction (extrusion direction). TD refers to the cross-machine direction.

MD modulus (stiffness) relative to LLDPE or other polymer is the ratio of the MD elastic modulus of the sheet relative to a like sheet of LLDPE or other polymer. A COC-containing sheet with an MD modulus of 100 has a relative modulus of 4 if a like sheet of the LLDPE has a modulus of 25.

MD elongation (ductility) relative to LLDPE or other polymer is the ratio of the MD elongation at break of the sheet relative to the MD elongation break of a like sheet of LLDPE or other polymer. A COC-containing sheet with an MD elongation of 750% has a relative MD elongation of 0.75 if a like sheet of LLDPE has an MD elongation of 1000%.

"Predominantly" and like terminology means more than 50% by weight.

Relative bottom or corner puncture resistance is the ratio of the puncture force observed with a COCE-containing part relative to a like part made of some other material. A COCE-containing part exhibiting a bottom puncture resistance of 12 lbf<sub>f</sub> has a relative bottom puncture resistance of 2 relative to LLDPE if a like part of LLDPE exhibits a bottom puncture resistance of 6 lbf.

"Puncture retention" is expressed in percent. This value is the percentage of puncture strength of thermoformed film to that of unformed film of the same composition and structure, further discussed herein.

"Thermoforming", "thermoformed" and like terminology is likewise given its ordinary meaning. In the simplest form, thermoforming is the draping of a softened sheet over a shaped mold. In the more advanced form, thermoforming is the automatic high speed positioning of a sheet having an accurately controlled temperature into a pneumatically actuated forming station whereby the article's shape is defined by the mold, followed by trimming and regrind collection as is well known in the art. Still other alternative arrangements include the use of drape, vacuum, pressure, free blowing, matched die, billow drape, vacuum snap-back, billow vacuum, plug assist vacuum, reverse draw with plug assist, pressure bubble immersion, trapped sheet, slip, diaphragm, twin-sheet cut sheet, twin-sheet roll-fed forming or any suitable combinations of the above. Details are provided in J. L. Throne's book, *Thermoforming*, published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain like texturized look. Suitable formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap. In some embodiments, the melt-compounded composition from which the articles are made optionally include polypropylene, additional polyethylene components and/or fillers and pigments such as titanium dioxide. Sheet is typically thermoformed at 20° C.-30° C. or more above its glass transition temperature (Tg) but well below its melting temperature range. When referring to thermoforming temperature, the temperature of sheet is specified. A "thermoforming window" is a temperature range over which the sheet material forms well at an areal draw ratio of 1.5 or more.

For convenience, the following abbreviations appear in the description and claims:

COC—cycloolefin copolymer
COCE—cycloolefin/ethylene copolymer
CV—coefficient of variation
EVA—ethylene/vinyl acetate resin
EVOH—ethylene/vinyl alcohol resin
PA—nylon
PE—polyethylene
HDPE—high density polyethylene
LDPE—low density polyethylene
LLDPE—linear low density polyethylene
MDPE—medium density polyethylene
PP—polypropylene
PVDC—polyvinylidene chloride Materials Cycloolefin/ethylene copolymer (COCE)

Cycloolefin/ethylene copolymer, sometimes referred to as COCE herein, refers to a copolymer of ethylene and a cyclic olefin such as norbornene. These polymers generally contain, based on the total weight of the cycloolefin copolymer, preferably from 0.1 to 99.9% by weight, of polymerized units which are derived from at least one polycyclic olefin of the following formulas I, II, II', III, IV, V or VI, shown below:

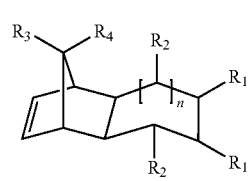

(V)

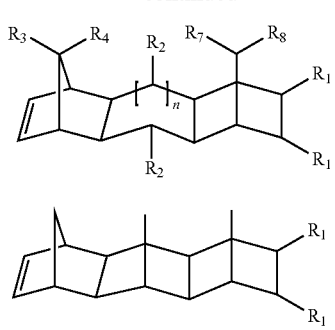

(VI)

(IV)

in which $R_1$, $R_2$, $R_3$, $R_4$, $R_5$, $R_6$, $R_7$ and $R_8$ are identical or different and are a hydrogen atom or a $C_1$-$C_{20}$-hydrocarbon radical, such as a linear or branched $C_1$-$C_8$-alkyl radical, $C_6$-$C_{18}$-aryl radical, $C_7$ $C_{20}$-alkylenearyl radical, or a cyclic or acyclic $C_2$ $C_{20}$-alkenyl radical, or form a saturated, unsaturated or aromatic ring, where identical radicals $R_1$ to $R_8$ in the various formulas I to VI can have a different meaning, and in which n can assume values from 0 to 5.

The cycloolefin units may also include derivatives of the cyclic olefins such as those having polar groups, for example, halogen, hydroxy, ester, alkoxy, carboxy, cyano, amido, imido or silyl groups.

Especially preferred resins include Topas® COCE resins grades 8007 (Tg of 80° C.), 5013, 6013 (Tg of 140° C.), and 9506 (Tg of 68° C.) as is discussed hereinafter.

Polyethylene (PE)

The inventive polymer formulations include a polyethylene component in addition to the cycloolefin/ethylene copolymer resin. Polyethylene is a semicrystalline thermoplastic whose properties depend to a major extent on the polymerization process (Saechtling, Kunststoff-Taschenbuch [Plastics handbook], 27th edition).

"HDPE" is polyethylene having a density of greater or equal to 0.941 g/cc. HDPE has a low degree of branching and thus stronger intermolecular forces and tensile strength. HDPE can be produced by chromium/silica catalysts, Ziegler-Natta catalysts or metallocene catalysts. The lack of branching is ensured by an appropriate choice of catalyst (e.g. Chromium catalysts or Ziegler-Natta catalysts) and reaction conditions.

"LDPE" is polyethylene having a density range of 0.910-0.940 g/cc. LDPE is prepared at high pressure with free-radical initiation, giving highly branched PE having internally branched side chains of varying length. Therefore, it has less strong intermolecular forces as the instantaneous-dipole induced-dipole attraction is less. This results in a lower tensile strength and increased ductility.

The term "LLDPE" is a substantially linear polyethylene, with significant numbers of short branches, commonly made by copolymerization of ethylene with short-chain α-olefins (e.g. copolymerization with 1-butene, 1-hexene, or 1-octene yield b-LLDPE, h-LLDPE, and o-LLDPE, respectively) via metal complex catalysts. LLDPE is typically manufactured in the density range of 0.915-0.925 g/cc. However, as a function of the α-olefin used and its content in the LLDPE, the density of LLDPE can be adjusted between that of HDPE and very low densities of 0.865 g/cc. Polyethylenes with very low densities are also termed VLDPE (very low density) or ULDPE (ultra low density). LLDPE has higher tensile strength than LDPE. Exhibits higher impact and puncture resistance than LDPE. Lower thickness (gauge) films can be blown compared to LDPE, with better environmental stress cracking resistance compared to LDPE. Lower thickness (gauge) may be used compared to LDPE.

"MDPE" is polyethylene having a density range of 0.926-0.940 g/cc. MDPE can be produced by chromium/silica catalysts, Ziegler-Natta catalysts or metallocene catalysts. MDPE has good shock and drop resistance properties. It also is less notch sensitive than HDPE, stress cracking resistance is better than HDPE.

Metallocene metal complex catalysts can be used to prepare LLDPEs with particular properties, e.g. high toughness and puncture resistance. Polyethylenes which are prepared with metallocene catalysts are termed "m-LLDPEs". The variability of the density range of m-LLDPEs is similar to that of the density range of LLDPE, and grades with extremely low densities are also termed plastomers.

In the case of all of the types of polyethylene, there are commercial grades with very different flowabilities. Molecular weight can be lowered via control of the chain-termination reaction to such an extent that the product comprises waxes. HDPE grades with very high molecular weights are termed HMWPE and UHMWPE.

The term "ionomer" encompasses a polyelectrolyte that comprises copolymers containing both electrically neutral repeating units and a fraction of ionic units (usually no more than 15%). Commercially available and widely used ionomers include products such as DuPont's Surlyn®.

"Nylon" is long-chain polyamide engineering thermoplastics which have recurring amide groups [—CO—NH—] as an integral part of the main polymer chain. Nylons may be synthesized from intermediates such as dicarboxylic acids, diamines, amino acids and lactams. Example nylons are as follows: nylon 4 (polypyrrolidone)-a polymer of 2-pyrrolidone [CH2CH2CH2C(O)NH]; nylon 6 (polycaprolactam)-made by the polycondensation of caprolactam [CH2(CH2) 4NHCO]; nylon 6/6-made by condensing hexamethylenediamine [H2N(CH2)6NH2] with adipic acid [COOH(CH2)4COOH]; nylon 6/10-made by condensing hexamethylenediamine with sebacic acid [COOH(CH2) 8COOH]; nylon 6/12-made from hexamethylenediamine and a 12-carbon dibasic acid; nylon 11-produced by polycondensation of the monomer 11-amino-undecanoic acid [NH2CH2 (CH2)9COOH]; nylon 12-made by the polymerization of laurolactam [CH2(CH2]10CO) or cyclododecalactam, with 11 methylene units between the linking —NH—CO— groups in the polymer chain.

"Polypropylene" includes thermoplastic resins made by polymerizing propylene with suitable catalysts, generally aluminum alkyl and titanium tetrachloride mixed with solvents. This definition includes all the possible geometric arrangements of the monomer unit, such as: with all methyl groups aligned on the same side of the chain (isotactic), with the methyl groups alternating (syndiotactic), all other forms where the methyl positioning is random (atactic), and mixtures thereof.

Vinylidene chloride based polymers (PVDC) are among the most widely used high oxygen barrier resins. Perhaps the most familiar examples of the vinylidene chloride based polymers used in packaging are commercial Saran® products. Other high oxygen barrier polymers also widely used, include ethylene vinyl alcohol (EVOH) copolymers and nylons.

Test Methods

Unless otherwise indicated the following test methods are employed, using the version in effect as of Jan. 1, 2007, unless otherwise noted:

| | |
|---|---|
| Film gauge | ASTM D374 |
| Total haze and gloss | ASTM D1003; ASTM D2457 |
| Tensile properties, elastic modulus and tensile strength | ASTM D882-02 |
| Puncture resistance | ASTM F1306 |
| Crush resistance | ASTM 649 |
| Elmendorf Tear | ASTM D1922 |
| Glass Transition Temperature | ASTM D3418 |

CONTROL EXAMPLES A-F AND EXAMPLES 1-9

15 films are described in Tables 1-10 and compared in Tables 11-14. Six films without cycloolefin/ethylene copolymer and nine films with between 15 and 30 weight percent cycloolefin/ethylene copolymer (sometimes labeled COCE herein) were extrusion cast on Davis Standard equipment. Typical extrusion conditions consist of a die temperature of about 210 C to 240° C., die pressure of about 600 to 750 psig, and roll temperatures of about 35° C. to 85° C. Two of the non-cycloolefin/ethylene copolymer films are heterogeneously catalyzed butene and octene LLDPE with respective density and melt index of 0.918 and 0.920 g/cc and 2.0 and 1.0 dg/min. Films representative of commercial medical forming products include 152 and 304 micron (6 and 12 mil) three-layer films consisting of LDPE-Ionomer-LDPE in 25/50/25 layer ratio.

Figure 7:
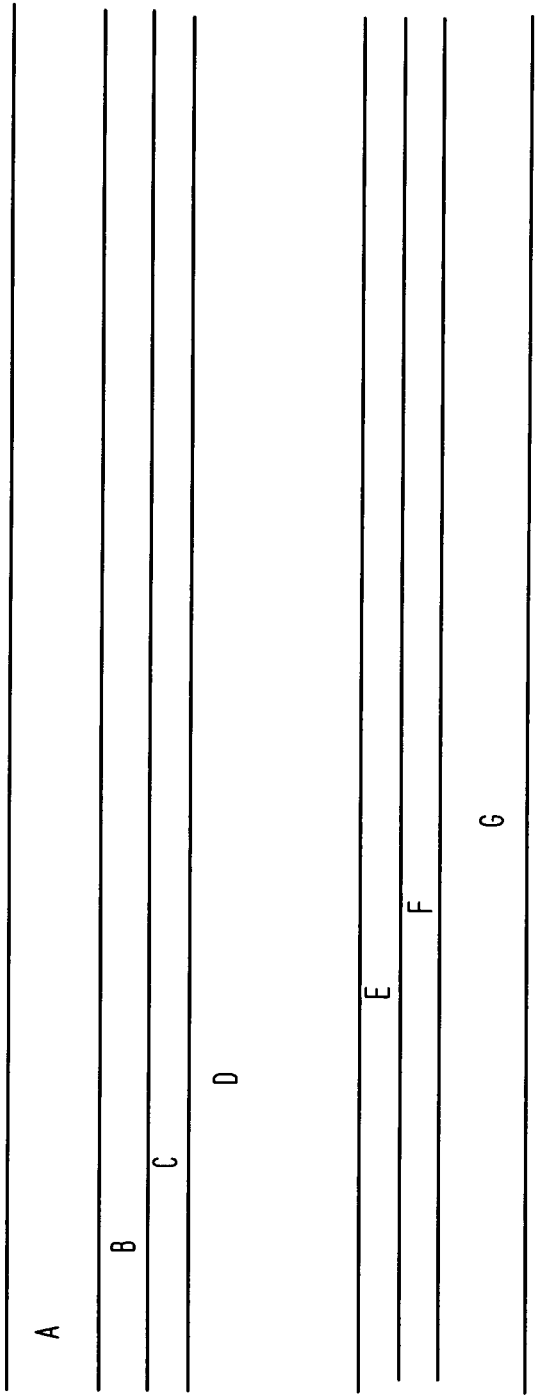
FIG. 7 is a schematic diagram of a layered structure of the present invention.

Five-layer film structures are described in Tables 7, 9, and 10 and compared to other films in Tables 11, 13, and 14. Two structures, Control E (olefin) and Control F (nylon), are representatives of commercial industrial, medical and food forming films. The third structure, Example 8, consists of butene LLDPE (b-LLDPE)-COCE-EVA-COCE-b-LLDPE. All five-layer films, with the exception of Control F, were extrusion cast. Seven-layer film structures, Examples 4-6, are described in Tables 4 and 5. These films were made on either Alpine or Battenfeld Gloucester Engineering production-scale blown film lines and have the A-B-C-D-E-F-G coextruded structure shown schematically in FIG. 7.

Several physical properties are summarized in Tables 15-28 (see below). Spider graphs of selected physical properties comparing various samples are plotted in FIGS. 1-6 (data for the Spider graphs can be viewed in Tables 29-34). All recorded property values are an arithmetic average of five specimens. Film gauge is measured with calibrated micrometers (ASTM D374). Material cost is calculated on unit area basis to account for changes in polymer density and gauge differences. Resins prices are taken from Plastics Technology On-Line. TOPAS cycloolefin/ethylene copolymer pricing is based on list. Total haze and gloss (Table 22) at 60° is measured using Gardner Haze meter according to respective ASTM D1003 and ASTM D2457 protocols. Tensile properties, elastic modulus and tensile strength (Tables 17-19), are measured in both machine and transverse directions on an Instron Universal tester according to ASTM D882-02. Film samples are die cut into 2.54×15.24 cm (1.0×6.0 inch) strips. They are conditioned for more than 40 hours at 23° C.±2° C./50%±5% RH. Gauge length is 5.08 cm (2.0 inches), set by the distance between the air grips. Cross-head speed is 50.8 cm/min (20 inch/minute). Puncture resistance (Tables 23 and 24) is measured according to ASTM F1306. The geometry of the unsupported film and the diameter of the puncture probe is the same as the flat film test. Unsupported film diameter is 3.175 cm (1.25-inch) and probe is hemispherical tipped, 0.635 cm (0.25-inch) in diameter. The test is run on an Instron Universal testing machine at a crosshead speed of 25.4 cm/min (10 inch/minute). Thermoforming: Process.

The Macron thermoformer is a modified pharmaceutical blister forming machine. Tooling is a fairly simple 6.35× 10.16-cm (2.5×4.0-inch) tray with depth of 2.54 cm (1 inch). The tray walls are tapered and all corners have curvature of half inch. The fifth side is designed to accommodate a peel tab for peelable lidding. Areal draw ratio for this tool is 1.87 (see FIG. 8). The reciprocal of this draw ratio multiplied by the initial film gauge will give the expected average gauge of the formed cavity. For 102, 119, 152 and 304 micron (4.0, 4.7, 6.0 and 12.0 mil) films, these expected values are 53.3, 63.5, 81.3 and 162.6 micron (2.1, 2.5, 3.2 and 6.4-mil) respectively.

Forming temperatures, shown in Table 15, are determined from trial and error. These temperatures are selected based on the best appearance of the formed cavities. Subsequent temperatures are selected in 5 or 10 C increments above and below the accepted initial forming temperature. Usually three temperatures were identified as the forming window for monolayer films and four temperatures were identified to describe the forming window for multilayer films. These forming window temperatures are summarized in Table 15. Under each forming temperature, the cycle time is adjusted to 10, 14 or 18 cycles per minute. For these trials, the forming pressure is held at 0.1378 MPa (20 psi). Once the best forming temperature and cycle time is determined, based on gauge distribution or more specifically, minimal gauge variation, the forming pressure is adjusted to 0.0689 to 0.2068 MPa (10 and 30 psi). From these final experiments, the optimum forming condition is identified.

Thermoforming: Tray Properties

Formed tray gauge distribution is quantified by coefficient of variation (CV). CV is defined as gauge standard deviation divided by the gauge mean (see Table 20). Under each forming condition, five cavities are measured. Six points on each formed cavity are measured separately in both machine and transverse directions (see FIG. 8). All tray gauge measurements are made with Magna-Mike 8000, Panametrics Inc. Optimum forming CV is the set of forming conditions with minimum gauge variation. The overall experimental design or forming window CV is the average CV of all forming conditions.

In addition to gauge distribution, four additional measurements are made on the formed cavities. They are retained volume (Table 25), crush resistance (Table 26), corner puncture (Table 27), and bottom puncture resistance (Table 28). These measurements are done on cavities thermoformed under optimum conditions.

Retained volume measures the amount or shrinkage or snap back in the formed cavity. Volume of the formed cavity is measure by water displacement (Topas Method). The formed cavity is supported in a fixture which prevents the cavity from distorting form the load applied by the water. This fixture is designed to accommodate multiple tray depths. The lips of the formed tray are secured to a clear thermoplastic lid to prevent spillage. Water is added through a port hole in the lid. After filling, water is siphoned directly into a graduated cylinder. Cavity volume is divided by the tool volume, defining retained volume (Table 25).

Crush resistance (Table 26) is measured using ASTM 649, Compressive Properties. The formed cavities are subjected to a force applied by two parallel plates. Test is run at 1.27 cm/min (0.5 inch/minute). Crush is defined as the amount of deflection undergone by the formed cavities at a load of 8.45 Newton (1.9 pounds force).

Puncture resistance (Tables 27 and 28) of the thermoformed cavities can be characterized in two locations, bottom and corner. The cavity bottom is the center of the tray. The corner is the one opposite of the peel tab. To maintain consistent test geometry with flat film, the formed cavity is mounted and secured on mandrel. The mandrel is mounded on a fixture in such a way to present the outer surface of the corner perpendicular to the puncture probe.

Details and results obtained for the various examples appear in Tables 1-28 below.

TABLE 1

Description of samples

| Film Sample Identity | Film Description | Structure | Process |
|---|---|---|---|
| Control A | 100% Octene LLDPE | mono | cast |
| Control B | 100% Butene LLDPE | mono | cast |
| Example 1 | o-LLDPE + 15% 8007F-100 | mono | cast |
| Example 2 | h-m-LLDPE + LDPE + 12% 9506 + 3% 6013 | mono | cast |
| Example 3 | o-LLDPE + 20% 8007F-100 | mono | cast |
| Example 4 | 9506 Discrete Layers | multi - 7 | blown |
| Example 5 | h-m-LLDPE + LDPE + 9506X5 Blend | multi - 7 | blown |
| Example 6 | h-m-LLDPE + LDPE + 9506X5 Blend | multi - 7 | blown |
| Example 7 | o-LLDPE + 30% 8007F-100 | mono | cast |
| Example 8 | b-LLDPE/8007F-100/EVA/8007F-100/b-LLDPE | multi - 5 | cast |
| Example 9 | b-LLDPE + 30% 8007F-100 | mono | cast |
| Control C | LDPE/Ionomer/LDPE | multi - 3 | cast |
| Control D | LDPE/Ionomer/LDPE | multi - 3 | cast |
| Control E | rPP/LLDPE + LDPE/rPP | multi - 5 | cast |
| Control F | PE/tie/PA/tie/PE | multi - 5 | blown |

TABLE 1-continued

Description of samples

| Film Sample Identity | TOPAS® COCE (%) | Film Material Cost ($/MSI) | Film Gauge (mil) |
|---|---|---|---|
| Control A | 0 | $0.175 | 6.0 |
| Control B | 0 | $0.147 | 6.0 |
| Example 1 | 15 | $0.206 | 6.0 |
| Example 2 | 15 | $0.171 | 4.7 |
| Example 3 | 20 | $0.217 | 6.0 |
| Example 4 | 24 | $0.190 | 4.7 |
| Example 5 | 25 | $0.245 | 6.0 |
| Example 6 | 25 | $0.163 | 4.0 |
| Example 7 | 30 | $0.238 | 6.0 |
| Example 8 | 30 | $0.215 | 6.0 |
| Example 9 | 30 | $0.218 | 6.0 |
| Control C | 0 | $0.232 | 6.0 |
| Control D | 0 | $0.464 | 12.0 |
| Control E | 0 | $0.172 | 6.0 |
| Control F | 0 | $0.243 | 5.9 |

| Film Sample Identity | Average Film Gauge (mil) | 1 | 2 | 3 | 4 | 5 |
|---|---|---|---|---|---|---|
| Control A | | | | | | |
| Control B | | | | | | |
| Example 1 | 6.24 | 6.10 | 6.40 | 6.20 | 6.40 | 6.10 |
| Example 2 | 4.50 | 4.60 | 4.20 | 4.60 | 4.90 | 4.20 |
| Example 3 | 6.18 | 6.50 | 6.30 | 6.10 | 6.00 | 6.00 |
| Example 4 | 4.94 | 5.00 | 5.00 | 4.90 | 4.80 | 5.00 |
| Example 5 | 6.18 | 6.30 | 6.20 | 6.30 | 6.10 | 6.00 |
| Example 6 | 4.46 | 4.50 | 4.40 | 4.40 | 4.50 | 4.50 |
| Example 7 | 6.28 | 6.30 | 6.20 | 6.10 | 6.40 | 6.40 |
| Example 8 | 5.88 | 5.70 | 5.80 | 6.00 | 6.00 | 5.90 |
| Example 9 | 6.48 | 6.70 | 6.50 | 6.50 | 6.50 | 6.20 |
| Control C | 6.12 | 6.20 | 6.00 | 6.00 | 6.40 | 6.00 |
| Control D | 12.08 | 12.00 | 12.40 | 11.80 | 12.00 | 12.20 |
| Control E | 6.00 | 6.20 | 5.90 | 6.00 | 6.00 | 5.90 |
| Control F | 6.12 | 6.20 | 6.20 | 6.00 | 6.00 | 6.20 |

TABLE 2a

Composition of Controls A and B.

| | | Control A: 100% Octene LLDPE | | | | | Control B: 100% Butene LLDPE | | | |
|---|---|---|---|---|---|---|---|---|---|---|
| ID Purpose Layer | Layer Thickness (%) | Material Percentage In Layer | Resin Type | Density (g/cc) | M.I. (dg/min) | Layer Thickness (%) | Material Percentage In Layer | Resin Type | Density (g/cc) | M.I. (dg/min) |
| A | 100 | 100 | o-LLDPE | 0.920 | 1.00 | 100 | 100 | b-LLDPE | 0.918 | 2.00 |

TABLE 2b

Composition of Examples 1 and 2.

| | | Example 1: o-LLDPE + 15% 8007F-100 (1, C) Good stiffness & thermoforming | | | | | Example 2: m-h-LLDPE + LDPE + 12% 9506 3% 6013 (1, C) TOPAS blend for broad thermoforming window | | | |
|---|---|---|---|---|---|---|---|---|---|---|
| ID Purpose Layer | Layer Thickness (%) | Material Percentage In Layer | Resin Type | Density (g/cc) | M.I. (dg/min) | Layer Thickness (%) | Material Percentage In Layer | Resin Type | Density (g/cc) | M.I. (dg/min) |
| A | 100 | 85 | o-LLDPE | 0.920 | 1.00 | 100 | 70 | m-h LLDPE | 0.918 | 1.00 |
| | | 15 | COCE: 8007F-100 | 1.020 | 9.90 | | 15 | LDPE | 0.919 | 0.70 |
| | | | | | | | 12 | COCE: 9506X5 | 1.020 | 5.40 |
| | | | | | | | 3 | COCE: 6013F-04 | 1.020 | 0.90 |

TABLE 3

Composition of Example 3.

Example 3:
o-LLDPE + 20% 8007F-100 (1, C)
More rigidity, less shrinkage and better appearance

| ID Purpose Layer | Layer Thickness (%) | Material Percentage In Layer | Resin Type | Density (g/cc) | M.I. (dg/min) |
|---|---|---|---|---|---|
| A | 100 | 80 | o-LLDPE | 0.920 | 1.00 |
|   |   | 20 | COCE: 8007F-100 | 1.020 | 9.90 |
| B |   |   |   |   |   |
| C |   |   |   |   |   |
| D |   |   |   |   |   |
| E |   |   |   |   |   |
| F |   |   |   |   |   |
| G |   |   |   |   |   |

TABLE 4

Composition of Example 4.

Example 4:
m-h-LLDPE + LDPE + 9506 Discrete (7, B)
High modulus film with excellent optics

| ID Purpose Layer | Layer Thickness (%) | Material Percentage In Layer | Resin Type | Density (g/cc) | M.I. (dg/min) |
|---|---|---|---|---|---|
| A | 17 | 75 | m-h LLDPE | 0.918 | 1.00 |
|   |   | 15 | COCE: 9506X5 | 1.020 | 5.40 |
|   |   | 10 | LDPE | 0.923 | 0.75 |
| B | 8 | 100 | COCE: 9506X5 | 1.020 | 5.40 |
| C | 8 | 70 | LDPE | 0.923 | 0.75 |
|   |   | 30 | m-h LLDPE | 0.918 | 1.00 |
| D | 33 | 100 | LDPE | 0.923 | 0.75 |
| E | 5 | 70 | LDPE | 0.923 | 0.75 |
|   |   | 30 | m-h LLDPE | 0.918 | 1.00 |
| F | 11 | 100 | COCE: 9506X5 | 1.020 | 5.40 |
| G | 18 | 75 | m-h LLDPE | 0.918 | 1.00 |
|   |   | 15 | COCE: 9506X5 | 1.020 | 5.40 |
|   |   | 10 | LDPE | 0.923 | 0.75 |

TABLE 5

Composition of Examples 5 and 6.

Examples 5 and 6:
m-h-LLDPE + LDPE + 9506/5013 Discrete (7, B)
High modulus film with excellent optics
and broader forming window

| ID Purpose Layer | Layer Thickness (%) | Material Percentage In Layer | Resin Type | Density (g/cc) | M.I. (dg/min) |
|---|---|---|---|---|---|
| A | 18 | 75 | m-h LLDPE | 0.918 | 1.50 |
|   |   | 15 | COCE: 9506X5 | 1.020 | 5.40 |
|   |   | 10 | LDPE | 0.919 | 0.70 |
| B | 10 | 70 | COCE: 9506X5 | 1.020 | 5.40 |
|   |   | 30 | COCE: 5013X14 | 1.020 | 8.10 |

TABLE 5-continued

Composition of Examples 5 and 6.

Examples 5 and 6:
m-h-LLDPE + LDPE + 9506/5013 Discrete (7, B)
High modulus film with excellent optics
and broader forming window

| ID Purpose Layer | Layer Thickness (%) | Material Percentage In Layer | Resin Type | Density (g/cc) | M.I. (dg/min) |
|---|---|---|---|---|---|
| C | 12 | 70 | LDPE | 0.919 | 0.70 |
|   |   | 30 | m-h LLDPE | 0.918 | 1.50 |
| D | 20 | 100 | LDPE | 0.919 | 0.70 |
| E | 12 | 70 | LDPE | 0.919 | 0.70 |
|   |   | 30 | m-h LLDPE | 0.918 | 1.50 |
| F | 10 | 70 | COCE: 9506X5 | 1.020 | 1.50 |
|   |   | 30 | COCE: 5013X14 | 1.020 | 8.10 |
| G | 18 | 75 | m-h LLDPE | 0.918 | 1.50 |
|   |   | 15 | COCE: 9506X5 | 1.020 | 5.40 |
|   |   | 10 | LDPE | 0.919 | 0.70 |

TABLE 6

Composition of Example 7.

Example 7:
o-LLDPE + 30% 8007F-100 (1, C)
Strong and rigid forming film with
excellent dimensional stability

| ID Purpose Layer | Layer Thickness (%) | Material Percentage In Layer | Resin Type | Density (g/cc) | M.I. (dg/min) |
|---|---|---|---|---|---|
| A | 100 | 70 | o-LLDPE | 0.920 | 1.00 |
|   |   | 30 | COCE: 8007F-100 | 1.020 | 9.90 |
| B |   |   |   |   |   |
| C |   |   |   |   |   |
| D |   |   |   |   |   |
| E |   |   |   |   |   |

TABLE 7

Composition of Example 8.

Example 8:
b-LLDPE/8007F-100/EVA/8007F-100/b-LLDPE (5, C)
Low cost forming film with excellent strength,
stiffness and optics

| ID Purpose Layer | Layer Thickness (%) | Material Percentage In Layer | Resin Type | Density (g/cc) | M.I. (dg/min) |
|---|---|---|---|---|---|
| A | 20 | 98 | b-LLDPE | 0.918 | 2.00 |
|   |   | 2 | Antiblock | 1.100 | 1.50 |
| B | 15 | 100 | COCE: 8007F-100 | 1.020 | 9.90 |
| C | 30 | 100 | EVA (3.5% VA) | 0.923 | 2.00 |
| D | 15 | 100 | COCE: 8007F-100 | 1.020 | 9.90 |
| E | 20 | 98 | b-LLDPE | 0.918 | 2.00 |
|   |   | 2 | Antiblock | 1.100 | 1.50 |

TABLE 8

Composition of Example 9.

Example 9:
b-LLDPE + 30% 8007F-100 (1, C)
Alternative, low cost LLDPE with COCE for strong
and rigid forming film

| ID Purpose Layer | Layer Thickness (%) | Material Percentage In Layer | Resin Type | Density (g/cc) | M.I. (dg/min) |
|---|---|---|---|---|---|
| A | 100 | 70 | b-LLDPE | 0.918 | 2.00 |
|   |     | 30 | COCE: 8007F-100 | 1.020 | 9.90 |
| B |  |  |  |  |  |
| C |  |  |  |  |  |
| D |  |  |  |  |  |
| E |  |  |  |  |  |

TABLE 9

Composition of Controls C, D, and E.

Controls C and D:
LDPE/Ionomer/LDPE
Premium medical thermoforming film
High clarity, deep draw and low gauge variation Control E:
rPP/LLDPE + LDPE/rPP
Low cost, shallow draw depth medical forming film

| ID Purpose Layer | Layer Thickness (%) | Material Percentage In Layer | Resin Type | Density (g/cc) | M.I. (dg/min) | Layer Thickness (%) | Material Percentage In Layer | Resin Type | Density (g/cc) | M.I. (dg/min) |
|---|---|---|---|---|---|---|---|---|---|---|
| A | 20 | 100 | LDPE | 0.923 |  | 10 | 100 | PP Random Copolymer | 0.902 | 6.50 |
| B | 60 | 100 | Ionomer | 0.940 |  | 10 | 100 | o-LLDPE | 0.920 | 1.00 |
| C | 20 | 100 | LDPE | 0.923 |  | 60 | 80 | o-LLDPE | 0.920 | 1.00 |
|   |    |     |      |       |  |    | 20 | LDPE | 0.918 |  |
| D |  |  |  |  |  | 10 | 100 | o-LLDPE | 0.920 | 1.00 |
| E |  |  |  |  |  | 10 | 100 | PP Random Copolymer | 0.902 | 6.50 |

TABLE 10

Composition of Control F.

Control F:
PE/Tie/PA/Tie/PE
Strong, tough medium draw
medical forming film

| ID Purpose Layer | Layer Thickness (%) | Material Percentage In Layer | Resin Type | Density (g/cc) | M.I. (dg/min) |
|---|---|---|---|---|---|
| A | 31 | 100 | LDPE | 0.918 |  |
| B | 5.5 | 100 | Tie | 0.930 |  |
| C | 27 | 100 | Nylon 6,66 | 1.140 |  |
| D | 5.5 | 100 | Tie | 0.930 |  |
| E | 31 | 100 | LDPE | 0.918 |  |

TABLE 11

Composition comparison of Example 7 and Control F.

Example 7: o-LLDPE + 30% 8007F-100 (6.0 mil)
Strong and rigid forming film with
excellent dimensional stability Control F: PE/Tie/PA/Tie/PE (5.9 mil)
Strong, tough medium draw
medical forming film

| ID Purpose Layer | Layer Thickness (%) | Material Percentage In Layer | Resin Type | Density (g/cc) | M.I. (dg/min) | Layer Thickness (%) | Material Percentage In Layer | Resin Type | Density (g/cc) | M.I. (dg/min) |
|---|---|---|---|---|---|---|---|---|---|---|
| A | 100 | 70 | o-LLDPE | 0.920 | 1.00 | 31 | 100 | LDPE | 0.918 |  |

TABLE 11-continued

Composition comparison of Example 7 and Control F.

| | Example 7: o-LLDPE + 30% 8007F-100 (6.0 mil) Strong and rigid forming film with excellent dimensional stability | | | | | Control F: PE/Tie/PA/Tie/PE (5.9 mil) Strong, tough medium draw medical forming film | | | | |
|---|---|---|---|---|---|---|---|---|---|---|
| ID Purpose Layer | Layer Thickness (%) | Material Percentage In Layer | Resin Type | Density (g/cc) | M.I. (dg/min) | Layer Thickness (%) | Material Percentage In Layer | Resin Type | Density (g/cc) | M.I. (dg/min) |
| | | 30 | COCE: 8007F-100 | 1.020 | 9.90 | | | | | |
| B | | | | | | 5.5 | 100 | Tie | 0.930 | |
| C | | | | | | 27 | 100 | Nylon 6,66 | 1.140 | |
| D | | | | | | 5.5 | 100 | Tie | 0.930 | |
| E | | | | | | 31 | 100 | LDPE | 0.918 | |

TABLE 12

Composition comparison of Example 2 and Control C.

| | Example 2: m-h-LLDPE + LDPE + 12% 9506 3% 6013 (4.7 mil) TOPAS blend for broad thermoforming window | | | | | Control C: LDPE/Ionomer/LDPE (6 mil) Premium medical thermoforming film High clarity, deep draw and low gauge variation | | | | |
|---|---|---|---|---|---|---|---|---|---|---|
| ID Purpose Layer | Layer Thickness (%) | Material Percentage In Layer | Resin Type | Density (g/cc) | M.I. (dg/min) | Layer Thickness (%) | Material Percentage In Layer | Resin Type | Density (g/cc) | M.I. (dg/min) |
| A | 100 | 70 | m-h LLDPE | 0.918 | 1.00 | 20 | 100 | LDPE | 0.923 | |
| | | 15 | LDPE | 0.919 | 0.70 | | | | | |
| | | 12 | COCE: 9506X5 | 1.020 | 5.40 | | | | | |
| | | 3 | COCE: 6013F-04 | 1.020 | 0.90 | | | | | |
| B | | | | | | 60 | 100 | Ionomer | 0.940 | |
| C | | | | | | 20 | 100 | LDPE | 0.923 | |

TABLE 13

Composition comparison of Example 2 and Control E.

| | Example 2: m-h-LLDPE + LDPE + 12% 9506 3% 6013 (4.7 mil) TOPAS blend for broad thermoforming window | | | | | Control E: rPP/LLDPE + LDPE/rPP (6.0 mil) Low cost, shallow draw depth medical forming film | | | | |
|---|---|---|---|---|---|---|---|---|---|---|
| ID Purpose Layer | Layer Thickness (%) | Material Percentage In Layer | Resin Type | Density (g/cc) | M.I. (dg/min) | Layer Thickness (%) | Material Percentage In Layer | Resin Type | Density (g/cc) | M.I. (dg/min) |
| A | 100 | 70 | m-h LLDPE | 0.918 | 1.00 | 10 | 100 | PP Random Copolymer | 0.902 | 6.50 |
| | | 15 | LDPE | 0.919 | 0.70 | | | | | |
| | | 12 | COCE: 9506X5 | 1.020 | 5.40 | | | | | |
| | | 3 | COCE: 6013F-04 | 1.020 | 0.90 | | | | | |
| B | | | | | | 10 | 100 | o-LLDPE | 0.920 | 1.00 |
| C | | | | | | 60 | 80 | o-LLDPE | 0.920 | 1.00 |
| | | | | | | | 20 | LDPE | 0.918 | |
| D | | | | | | 10 | 100 | o-LLDPE | 0.920 | 1.00 |
| E | | | | | | 10 | 100 | PP Random Copolymer | 0.902 | 6.50 |

TABLE 14

Composition comparison of Example 8 and Control D.

| | b-LLDPE/8007F-100/EVA/8007F-100/b-LLDPE (6 mil) Low cost forming film with excellent strength, stiffness and optics | | | | | LDPE/Ionomer/LDPE (12 mil) Premium medical thermoforming film High clarity, deep draw and low gauge variation | | | | |
|---|---|---|---|---|---|---|---|---|---|---|
| ID Purpose Layer | Layer Thickness (%) | Material Percentage In Layer | Resin Type | Density (g/cc) | M.I. (dg/min) | Layer Thickness (%) | Material Percentage In Layer | Resin Type | Density (g/cc) | M.I. (dg/min) |
| A | 20 | 98 | b-LLDPE | 0.918 | 2.00 | 20 | 100 | LDPE | 0.923 | |
| | | 2 | Antiblock | 1.100 | 1.50 | | | | | |
| B | 15 | 100 | COCE: 8007F-100 | 1.020 | 9.90 | 60 | 100 | Ionomer | 0.940 | |
| C | 30 | 100 | EVA (3.5% VA) | 0.923 | 2.00 | 20 | 100 | LDPE | 0.923 | |
| D | 15 | 100 | COCE: 8007F-100 | 1.020 | 9.90 | | | | | |
| E | 20 | 98 | b-LLDPE | 0.918 | 2.00 | | | | | |
| | | 2 | Antiblock | 1.100 | 1.50 | | | | | |

TABLE 15

Forming Temperatures.

| Film Description | TOPAS ® COCE (%) | Forming Temperature Range (° C.) | Optimal Forming Temperature (° C.) | Gauge (mil) |
|---|---|---|---|---|
| Control A: 100% Octene LLDPE | 0 | 95, 100, 105 | 95 | 6.0 |
| Control B: 100% butene LLDPE | 0 | 95, 100, 105 | 95 | 6.0 |
| Example 1: o-LLDPE + 15% 8007F-100 (1, C) | 15† | 90, 95, 100† | 95† | 6.0† |
| Example 2: h-m-LLDPE + LDPE + 12% 9506 + 3% 6013 (1, C) | 15† | 95, 100, 105† | 100† | 4.7† |
| Example 3: o-LLDPE + 20% 8007F-100 (1, C) | 20 | 100, 105, 110 | 105 | 6.0 |
| Example 4: m-h-LLDPE + LDPE + 9506 Discrete (7, B) | 24 | 85, 90, 95, 100 | 90 | 4.7 |
| Example 5: m-h-LLDPE + LDPE + 9506/5013 Discrete (7, B) | 25* | 90, 95, 100, 105* | 95* | 6.0* |
| Example 6: m-h-LLDPE + LDPE + 9506/5013 Discrete (7, B) | 25 | 90, 95, 100 | 90 | 4.0 |
| Example 7: o-LLDPE + 30% 8007F-100 (1, C) | 30 | 100, 105, 110 | 105 | 6.0 |
| Example 8: b-LLDPE/8007F-100/EVA/8007F-100/b-LLDPE (5, C) | 30 | 85, 95, 100, 105 | 105 | 6.0 |
| Example 9: b-LLDPE + 30% 8007F-100 (1, C) | 30 | 95, 100, 105 | 100 | 6.0 |
| Control C: LDPE/Ionomer/LDPE (3, C) | 0 | 80, 85, 90, 95 | 90 | 6.0 |
| Control D: LDPE/Ionomer/LDPE (3, C) | 0 | 80, 85, 90, 100 | 85 | 12.0 |
| Control E: rPP/LLDPE + LDPE/rPP (5, C) | 0 | 90, 100, 110 | 110 | 6.0 |
| Control F: PE/tie/PA/tie/PE (5, B) | 0* | 85, 90, 95, 100* | 90* | 5.9* |

*Forming Temperatures Are Similar For COCE & Non-COCE Films
†Forming Temperatures Depend On Tg Of COCE, Gauge & Other Polymers

TABLE 16

Forming Gauge.

| Film Description | TOPAS ® COCE (%) | Forming Matrix Average Gauge (mil) | Theoretical Based on Actual Film Gauge (mil) | Nominal Gauge (mil) | Actual Gauge (mil) | Formed Bottom Gauge (mil) | Formed Corner Gauge (mil) |
|---|---|---|---|---|---|---|---|
| Control A: 100% Octene LLDPE | 0 | | | 6.0 | | 3.0 | 2.4 |
| Control B: 100% butene LLDPE | 0 | | | 6.0 | | 3.1 | 1.6 |
| Example 1: o-LLDPE + 15% 8007F-100 (1, C) | 15 | 3.20 | 3.34 | 6.0 | 6.24 | 3.6 | 2.0 |
| Example 2: h-m-LLDPE + LDPE + 12% 9506 + 3% 6013 (1, C) | 15 | 1.83 | 2.41 | 4.7 | 4.50 | 2.9 | 1.1 |
| Example 3: o-LLDPE + 20% 8007F-100 (1, C) | 20 | 3.17 | 3.30 | 6.0 | 6.18 | 4.0 | 2.0 |
| Example 4: m-h-LLDPE + LDPE + 9506 Discrete (7, B) | 24 | 2.62 | 2.64 | 4.7 | 4.94 | 2.6 | 1.4 |
| Example 5: m-h-LLDPE + LDPE + 9506/5013 Discrete (7, B) | 25 | 2.80 | 3.30 | 6.0 | 6.18 | 3.0 | 3.1 |
| Example 6: m-h-LLDPE + LDPE + 9506/5013 Discrete (7, B) | 25 | 2.10 | 2.39 | 4.0 | 4.46 | 2.1 | 2.3 |
| Example 7: o-LLDPE + 30% 8007F-100 (1, C) | 30 | 3.62 | 3.36 | 6.0 | 6.28 | 4.4 | 2.0 |
| Example 8: b-LLDPE/8007F-100/EVA/8007F-100/b-LLDPE (5, C) | 30 | 3.00 | 3.14 | 6.0 | 5.88 | 3.4 | 1.6 |

TABLE 16-continued

Forming Gauge.

| Film Description | TOPAS ® COCE (%) | Forming Matrix Average Gauge (mil) | Theoretical Based on Actual Film Gauge (mil) | Nominal Gauge (mil) | Actual Gauge (mil) | Formed Bottom Gauge (mil) | Formed Corner Gauge (mil) |
|---|---|---|---|---|---|---|---|
| Example 9: b-LLDPE + 30% 8007F-100 (1, C) | 30 | 3.80 | 3.47 | 6.0 | 6.48 | 3.9 | 1.8 |
| Control C: LDPE/Ionomer/LDPE (3, C) | 0 | 3.20 | 3.27 | 6.0 | 6.12 | 3.9 | 1.8 |
| Control D: LDPE/Ionomer/LDPE (3, C) | 0 | 6.00 | 6.46 | 12.0 | 12.08 | 7.0 | 4.0 |
| Control E: rPP/LLDPE + LDPE/rPP (5, C) | 0 | 2.51 | 3.21 | 6.0 | 6.00 | 3.0 | 1.2 |
| Control F: PE/tie/PA/tie/PE (5, B) | 0 | 3.30 | 3.27 | 5.9 | 6.12 | 3.3 | 1.5 |

Theoretical Average Forming Gauge = 1/Areal Draw Ratio × Actual Flat Film Gauge
Areal Draw Ratio = 1.87 For 1-inch Deep Macron Tray Tool

TABLE 17

Elastic Modulus.

| Film Description | TOPAS ® COCE (%) | MD (ksi) | TD (ksi) | Material Cost ($/MSI) | Gauge (mil) |
|---|---|---|---|---|---|
| Control A: 100% Octene LLDPE | 0 | 25.9 | 28.7 | $0.175 | 6.0 |
| Control B: 100% butene LLDPE | 0 | 27.6 | 26.1 | $0.147 | 6.0 |
| Example 1: o-LLDPE + 15% 8007F-100 (1, C) | 15 | 48.9 | 38.0 | $0.206 | 6.0 |
| Example 2: h-m-LLDPE + LDPE + 12% 9506 + 3% 6013 (1, C) | 15 | 60.3 | 43.5 | $0.170 | 4.7 |
| Example 3: o-LLDPE + 20% 8007F-100 (1, C) | 20 | 51.5 | 33.5 | $0.217 | 6.0 |
| Example 4: m-h-LLDPE + LDPE + 9506 Discrete (7, B) | 24 | 99.6 | 96.3 | $0.190 | 4.7 |
| Example 5: m-h-LLDPE + LDPE + 9506/5013 Discrete (7, B) | 25* | 112.0* | 109.0* | $0.245* | 6.0* |
| Example 6: m-h-LLDPE + LDPE + 9506/5013 Discrete (7, B) | 25* | 109.0* | 102.0* | $0.163* | 4.0* |
| Example 7: o-LLDPE + 30% 8007F-100 (1, C) | 30 | 70.4 | 48.8 | $0.238 | 6.0 |
| Example 8: b-LLDPE/8007F-100/EVA/8007F-100/b-LLDPE (5, C) | 30 | 70.9 | 72.8 | $0.215 | 6.0 |
| Example 9: b-LLDPE + 30% 8007F-100 (1, C) | 30 | 82.8 | 53.4 | $0.218 | 6.0 |
| Control C: LDPE/Ionomer/LDPE (3, C) | 0† | 23.6† | 24.3† | $0.232† | 6.0† |
| Control D: LDPE/Ionomer/LDPE (3, C) | 0† | 22.1† | 23.0† | $0.464† | 12.0† |
| Control E: rPP/LLDPE + LDPE/rPP (5, C) | 0† | 42.6† | 42.0† | $0.172† | 6.0† |
| Control F: PE/tie/PA/tie/PE (5, B) | 0† | 85.4† | 67.9† | $0.243† | 5.9† |

*Higher Stiffness Enables Cost Savings By Downgauging
†Most COCE Containing Films Are Stiffer Than Those Without COCE

TABLE 18

Tensile Break.

| Film Description | TOPAS ® COCE (%) | MD (ksi) | TD (ksi) | Material Cost ($/MSI) | Gauge (mil) |
|---|---|---|---|---|---|
| Control A: 100% Octene LLDPE | 0 | 3.82 | 2.69 | $0.175 | 6.0 |
| Control B: 100% butene LLDPE | 0 | 3.94 | 3.31 | $0.147 | 6.0 |
| Example 1: o-LLDPE + 15% 8007F-100 (1, C) | 15* | 5.03* | 4.98* | $0.206* | 6.0* |
| Example 2: h-m-LLDPE + LDPE + 12% 9506 + 3% 6013 (1, C) | 15 | 4.55 | 5.85 | $0.170 | 4.7 |
| Example 3: o-LLDPE + 20% 8007F-100 (1, C) | 20* | 5.42* | 5.28* | $0.217* | 6.0* |
| Example 4: m-h-LLDPE + LDPE + 9506 Discrete (7, B) | 24 | 4.30 | 3.53 | $0.190 | 4.7 |
| Example 5: m-h-LLDPE + LDPE + 9506/5013 Discrete (7, B) | 25** | 3.72** | 3.57** | $0.245** | 6.0** |
| Example 6: m-h-LLDPE + LDPE + 9506/5013 Discrete (7, B) | 25 | 3.88 | 3.49 | $0.163 | 4.0 |
| Example 7: o-LLDPE + 30% 8007F-100 (1, C) | 30* | 5.52* | 5.58* | $0.238* | 6.0* |
| Example 8: b-LLDPE/8007F-100/EVA/8007F-100/b-LLDPE (5, C) | 30** | 3.61** | 3.19** | $0.215** | 6.0** |
| Example 9: b-LLDPE + 30% 8007F-100 (1, C) | 30 | 4.62† | 2.89† | $0.218† | 6.0† |
| Control C: LDPE/Ionomer/LDPE (3, C) | 0† | 4.12† | 3.10† | $0.232† | 6.0† |
| Control D: LDPE/Ionomer/LDPE (3, C) | 0† | 3.72† | 3.24† | $0.464† | 12.0† |
| Control E: rPP/LLDPE + LDPE/rPP (5, C) | 0† | 5.78 | 4.62 | $0.172 | 6.0 |
| Control F: PE/tie/PA/tie/PE (5, B) | 0 | 7.48 | 6.41 | $0.243 | 5.9 |

*COCE Addition In Octene LLDPE Increases Tensile Strength In MD & TD
**LLDPE-COCE-LLDPE Films Tend To Have Lower Tensile Strength
†Both COCE And Ionomer Forming Films Have Similar Tensile Strength

TABLE 19

Elongation Break.

| Film Description | TOPAS® COCE (%) | MD (%) | TD (%) | Material Cost ($/MSI) | Gauge (mil) |
|---|---|---|---|---|---|
| Control A: 100% Octene LLDPE | 0 | 1077 | 1077 | $0.175 | 6.0 |
| Control B: 100% butene LLDPE | 0 | 1307 | 1303 | $0.147 | 6.0 |
| Example 1: o-LLDPE + 15% 8007F-100 (1, C) | 15* | 952* | 1072* | $0.206* | 6.0* |
| Example 2: h-m-LLDPE + LDPE + 12% 9506 + 3% 6013 (1, C) | 15 | 420 | 730 | $0.170 | 4.7 |
| Example 3: o-LLDPE + 20% 8007F-100 (1, C) | 20* | 863* | 1008* | $0.217* | 6.0* |
| Example 4: m-h-LLDPE + LDPE + 9506 Discrete (7, B) | 24 | 443 | 501 | $0.190 | 4.7 |
| Example 5: m-h-LLDPE + LDPE + 9506/5013 Discrete (7, B) | 25** | 370** | 360** | $0.245** | 6.0** |
| Example 6: m-h-LLDPE + LDPE + 9506/5013 Discrete (7, B) | 25 | 390 | 440 | $0.163 | 4.0 |
| Example 7: o-LLDPE + 30% 8007F-100 (1, C) | 30* | 676* | 857* | $0.238* | 6.0* |
| Example 8: b-LLDPE/8007F-100/EVA/8007F-100/b-LLDPE (5, C) | 30** | 443** | 433** | $0.215** | 6.0** |
| Example 9: b-LLDPE + 30% 8007F-100 (1, C) | 30 | 632 | 692 | $0.218 | 6.0 |
| Control C: LDPE/Ionomer/LDPE (3, C) | 0† | 599† | 714† | $0.232† | 6.0† |
| Control D: LDPE/Ionomer/LDPE (3, C) | 0 | 723 | 758 | $0.464 | 12.0 |
| Control E: rPP/LLDPE + LDPE/rPP (5, C) | 0 | 1180 | 1188 | $0.172 | 6.0 |
| Control F: PE/tie/PA/tie/PE (5, B) | 0† | 813† | 763† | $0.243† | 5.9† |

*Octene LLDPE-COCE Films Are More Ductile
**LDPE in LLDPE-COCE-LDPE Films Tends To Reduce Ductility
†Most COCE Containing Films Have Similar Ductility As Non-COCE Films

TABLE 20

Forming CV.

| Film Description | TOPAS® COCE (%) | Optimal Forming CV (%) | Forming Matrix CV (%) | CV Difference (%) | Material Cost ($/MSI) | Gauge (mil) |
|---|---|---|---|---|---|---|
| Control A: 100% Octene LLDPE | 0 | 13.6 | 26.5 | 12.9 | $0.175 | 6.0 |
| Control B: 100% butene LLDPE | 0 | 15.6 | 21.0 | 5.4 | $0.147 | 6.0 |
| Example 1: o-LLDPE + 15% 8007F-100 (1, C) | 15† | 19.5† | 22.1† | 2.6† | $0.206† | 6.0† |
| Example 2: h-m-LLDPE + LDPE + 12% 9506 + 3% 6013 (1, C) | 15† | 13.5† | 16.2† | 2.7† | $0.170† | 4.7† |
| Example 3: o-LLDPE + 20% 8007F-100 (1, C) | 20* | 17.7* | 21.5* | 3.8* | $0.217* | 6.0* |
| Example 4: m-h-LLDPE + LDPE + 9506 Discrete (7, B) | 24 | 20.5 | 23.2 | 2.7 | $0.190 | 4.7 |
| Example 5: m-h-LLDPE + LDPE + 9506/5013 Discrete (7, B) | 25* | 26.1* | 28.5* | 2.4* | $0.245* | 6.0* |
| Example 6: m-h-LLDPE + LDPE + 9506/5013 Discrete (7, B) | 25 | 24.6 | 26.4 | 1.8 | $0.163 | 4.0 |
| Example 7: o-LLDPE + 30% 8007F-100 (1, C) | 30* | 15.8* | 16.8* | 1.0* | $0.238* | 6.0* |
| Example 8: b-LLDPE/8007F-100/EVA/8007F-100/b-LLDPE (5, C) | 30* | 16.9* | 17.2* | 0.3* | $0.215* | 6.0* |
| Example 9: b-LLDPE + 30% 8007F-100 (1, C) | 30** | 13.4** | 15.6** | 2.2** | $0.218** | 6.0** |
| Control C: LDPE/Ionomer/LDPE (3, C) | 0** | 8.3** | 13.7** | 5.4** | $0.232** | 6.0** |
| Control D: LDPE/Ionomer/LDPE (3, C) | 0 | 10.2 | 13.9 | 3.7 | $0.464 | 12.0 |
| Control E: rPP/LLDPE + LDPE/rPP (5, C) | 0 | 36.9 | 45.0 | 8.1 | $0.172 | 6.0 |
| Control F: PE/tie/PA/tie/PE (5, B) | 0 | 17.8 | 22.7 | 4.9 | $0.243 | 5.9 |

*Gauge Variation Narrows Considerably Between The Best And All Other Forming Conditions For Most COCE Films, Suggesting COCE Provides Robust Forming Window
**Both COCE And Ionomer Forming Films Have Low Gauge Variation
†Excellent Forming Is Maintained After Downgauging

TABLE 21

Elmendorf Tear.

| Film Description | TOPAS® COCE (%) | MD (g) | TD (g) | Material Cost ($/MSI) | Gauge (mil) |
|---|---|---|---|---|---|
| Control A: 100% Octene LLDPE | 0 | 2808 | 3740 | $0.175 | 6.0 |
| Control B: 100% butene LLDPE | 0 | 601 | 847 | $0.147 | 6.0 |
| Example 1: o-LLDPE + 15% 8007F-100 (1, C) | 15* | 2,154* | 995* | $0.206* | 6.0* |
| Example 2: h-m-LLDPE + LDPE + 12% 9506 + 3% 6013 (1, C) | 15† | 459† | 584† | $0.170† | 4.7† |
| Example 3: o-LLDPE + 20% 8007F-100 (1, C) | 20* | 1,723* | 355* | $0.217* | 6.0* |
| Example 4: m-h-LLDPE + LDPE + 9506 Discrete (7, B) | 24 | 202 | 312 | $0.190 | 4.7 |
| Example 5: m-h-LLDPE + LDPE + 9506/5013 Discrete (7, B) | 25† | 249† | 438† | $0.245† | 6.0† |
| Example 6: m-h-LLDPE + LDPE + 9506/5013 Discrete (7, B) | 25 | 103 | 220 | $0.163 | 4.0 |

TABLE 21-continued

Elmendorf Tear.

| Film Description | TOPAS® COCE (%) | MD (g) | TD (g) | Material Cost ($/MSI) | Gauge (mil) |
|---|---|---|---|---|---|
| Example 7: o-LLDPE + 30% 8007F-100 (1, C) | 30* | 487* | 278* | $0.238* | 6.0* |
| Example 8: b-LLDPE/8007F-100/EVA/8007F-100/b-LLDPE (5, C) | 30† | 215† | 264† | $0.215† | 6.0† |
| Example 9: b-LLDPE + 30% 8007F-100 (1, C) | 30 | 164 | 264 | $0.218 | 6.0 |
| Control C: LDPE/Ionomer/LDPE (3, C) | 0** | 316** | 224** | $0.232** | 6.0** |
| Control D: LDPE/Ionomer/LDPE (3, C) | 0 | 524 | 589 | $0.464 | 12.0 |
| Control E: rPP/LLDPE + LDPE/rPP (5, C) | 0 | 2,399 | 3,555 | $0.172 | 6.0 |
| Control F: PE/tie/PA/tie/PE (5, B) | 0** | 498** | 521** | $0.243** | 5.9** |

*COCE Reduces The Resistance To Tear Propagation, Especially In TD
**COCE Films Offer Tear Resistance Similar To Ionomer & Nylon
†LDPE Reduces Tear Resistance In LLDPE-COCE-LDPE Films

TABLE 22

Haze and Gloss.

| Film Description | TOPAS® COCE (%) | Haze (%) | Gloss (60°) | Material Cost ($/MSI) | Gauge (mil) |
|---|---|---|---|---|---|
| Control A: 100% Octene LLDPE | 0 | 20.0 | 56 | $0.175 | 6.0 |
| Control B: 100% butene LLDPE | 0 | 10.0 | 105 | $0.147 | 6.0 |
| Example 1: o-LLDPE + 15% 8007F-100 (1, C) | 15** | 23.8** | 78** | $0.206** | 6.0** |
| Example 2: h-m-LLDPE + LDPE + 12% 9506 + 3% 6013 (1, C) | 15* | 6.7* | 88* | $0.170* | 4.7* |
| Example 3: o-LLDPE + 20% 8007F-100 (1, C) | 20 | 20.4 | 86 | $0.217 | 6.0 |
| Example 4: m-h-LLDPE + LDPE + 9506 Discrete (7, B) | 24* | 9.3* | 123* | $0.190* | 4.7* |
| Example 5: m-h-LLDPE + LDPE + 9506/5013 Discrete (7, B) | 25** | 11.8** | 125** | $0.245** | 6.0** |
| Example 6: m-h-LLDPE + LDPE + 9506/5013 Discrete (7, B) | 25 | 8.0 | 132 | $0.163 | 4.0 |
| Example 7: o-LLDPE + 30% 8007F-100 (1, C) | 30 | 25.5 | 70 | $0.238 | 6.0 |
| Example 8: b-LLDPE/8007F-100/EVA/8007F-100/b-LLDPE (5, C) | 30* | 7.9* | 120* | $0.215* | 6.0* |
| Example 9: b-LLDPE + 30% 8007F-100 (1, C) | 30 | 32.2 | 80 | $0.218 | 6.0 |
| Control C: LDPE/Ionomer/LDPE (3, C) | 0† | 7.6† | 102† | $0.232† | 6.0† |
| Control D: LDPE/Ionomer/LDPE (3, C) | 0 | 11.5 | 99 | $0.464 | 12.0 |
| Control E: rPP/LLDPE + LDPE/rPP (5, C) | 0 | 26.1 | 74 | $0.172 | 6.0 |
| Control F: PE/tie/PA/tie/PE (5, B) | 0† | 14.4† | 109† | $0.243† | 5.9† |

*Low Haze and High Gloss Can Be Achieved In COCE Films
**Influenced By Bulk Properties Of LLDPE & LDPE and Layer Structure
†Optics Of COCE Films Are Competitive With Ionomer and Nylon Films

TABLE 23

Puncture Resistance.

| Film Description | TOPAS® COCE (%) | Slow Puncture (lb) | Fast Puncture (lb) | Material Cost ($/MSI) | Gauge (mil) |
|---|---|---|---|---|---|
| Control A: 100% Octene LLDPE | 0 | 6.5 | 39.1 | $0.175 | 6.0 |
| Control B: 100% butene LLDPE | 0 | 7.5 | 27.2 | $0.147 | 6.0 |
| Example 1: o-LLDPE + 15% 8007F-100 (1, C) | 15* | 6.9* | 42.5* | $0.206* | 6.0* |
| Example 2: h-m-LLDPE + LDPE + 12% 9506 + 3% 6013 (1, C) | 15† | 8.9† | 37.5† | $0.170† | 4.7† |
| Example 3: o-LLDPE + 20% 8007F-100 (1, C) | 20* | 7.9* | 47.9* | $0.217* | 6.0* |
| Example 4: m-h-LLDPE + LDPE + 9506 Discrete (7, B) | 24 | 7.9 | 33.3 | $0.190 | 4.7 |
| Example 5: m-h-LLDPE + LDPE + 9506/5013 Discrete (7, B)* | 25** | 10.4** | 38.2** | $0.245** | 6.0** |
| Example 6: m-h-LLDPE + LDPE + 9506/5013 Discrete (7, B) | 25 | 7.1 | 27.7 | $0.163 | 4.0 |
| Example 7: o-LLDPE + 30% 8007F-100 (1, C) | 30* | 8.8* | 54.9* | $0.238* | 6.0* |
| Example 8: b-LLDPE/8007F-100/EVA/8007F-100/b-LLDPE (5, C) | 30** | 9.3** | 36.4** | $0.215** | 6.0** |
| Example 9: b-LLDPE + 30% 8007F-100 (1, C) | 30 | 8.7 | 47.0 | $0.218 | 6.0 |
| Control C: LDPE/Ionomer/LDPE (3, C) | 0 | 9.2 | 56.9 | $0.232 | 6.0 |
| Control D: LDPE/Ionomer/LDPE (3, C) | 0 | 17.7 | 89.9 | $0.464 | 12.0 |
| Control E: rPP/LLDPE + LDPE/rPP (5, C) | 0† | 9.0† | 28.6† | $0.172† | 6.0† |
| Control F: PE/tie/PA/tie/PE (5, B) | 0 | 12.6 | 67.0 | $0.243 | 5.9 |

*Puncture Resistance Increases in Monolayer Films With Addition of COCE
**Puncture Resistance, Especially at High Speed, May Be Reduced by LDPE
†Downgauging Can Save Cost Without Compromising Puncture Resistance

TABLE 24

Puncture energy.

| Film Description | TOPAS® COCE (%) | Slow Puncture Energy (in-lb) | Fast Puncture Energy (in-lb) | Material Cost ($/MSI) | Gauge (mil) |
|---|---|---|---|---|---|
| Control A: 100% Octene LLDPE | 0 | 4.4 | | $0.175 | 6.0 |
| Control B: 100% butene LLDPE | 0 | 4.5 | | $0.147 | 6.0 |
| Example 1: o-LLDPE + 15% 8007F-100 (1, C) | 15 | 2.3 | 42.0 | $0.206 | 6.0 |
| Example 2: h-m-LLDPE + LDPE + 12% 9506 + 3% 6013 (1, C) | 15† | 5.2† | 26.4† | $0.170† | 4.7† |
| Example 3: o-LLDPE + 20% 8007F-100 (1, C) | 20 | 2.2 | 49.2 | $0.217 | 6.0 |
| Example 4: m-h-LLDPE + LDPE + 9506 Discrete (7, B) | 24 | 2.7 | 12.0 | $0.190 | 4.7 |
| Example 5: m-h-LLDPE + LDPE + 9506/5013 Discrete (7, B) | 25** | 5.4** | 14.5** | $0.245** | 6.0** |
| Example 6: m-h-LLDPE + LDPE + 9506/5013 Discrete (7, B) | 25 | 3.4 | 9.8 | $0.163 | 4.0 |
| Example 7: o-LLDPE + 30% 8007F-100 (1, C) | 30 | 2.4 | 49.2 | $0.238 | 6.0 |
| Example 8: b-LLDPE/8007F-100/EVA/8007F-100/b-LLDPE (5, C) | 30** | 2.2** | 13.2** | $0.215** | 6.0** |
| Example 9: b-LLDPE + 30% 8007F-100 (1, C) | 30* | 4.4* | 27.6* | $0.218* | 6.0* |
| Control C: LDPE/Ionomer/LDPE (3, C) | 0* | 4.1* | 34.8* | $0.232* | 6.0* |
| Control D: LDPE/Ionomer/LDPE (3, C) | 0 | 8.2 | 46.2 | $0.464 | 12.0 |
| Control E: rPP/LLDPE + LDPE/rPP (5, C) | 0† | 5.0† | 14.4† | $0.172† | 6.0† |
| Control F: PE/tie/PA/tie/PE (5, B) | 0 | 5.6 | 67.2 | $0.243 | 5.9 |

*Lower Cost Butene LLDPE Film With 30% COCE Is As Tough As Ionomer Film
**Toughness, at Fast Speed, May Be Reduced by LDPE In The Film Structure
†Thinner Gauge COCE-LLDPE Is Tougher Than PP-LDPE-LLDPE Coex.

TABLE 25

Retained volume.

| Film Description | TOPAS® COCE (%) | Retained Volume (%) | Material Cost ($/MSI) | Gauge (mil) |
|---|---|---|---|---|
| Control A: 100% Octene LLDPE | 0 | 95 | $0.175 | 6.0 |
| Control B: 100% butene LLDPE | 0 | 96.9 | $0.147 | 6.0 |
| Example 1: o-LLDPE + 15% 8007F-100 (1, C) | 15* | 96.7* | $0.206* | 6.0* |
| Example 2: h-m-LLDPE + LDPE + 12% 9506 + 3% 6013 (1, C) | 15† | 91.8† | $0.170† | 4.7† |
| Example 3: o-LLDPE + 20% 8007F-100 (1, C) | 20* | 100.0* | $0.217* | 6.0* |
| Example 4: m-h-LLDPE + LDPE + 9506 Discrete (7, B) | 24† | 89.4† | $0.190† | 4.7† |
| Example 5: m-h-LLDPE + LDPE + 9506/5013 Discrete (7, B) | 25** | 86.8** | $0.245** | 6.0** |
| Example 6: m-h-LLDPE + LDPE + 9506/5013 Discrete (7, B) | 25** | 89.9** | $0.163** | 4.0** |
| Example 7: o-LLDPE + 30% 8007F-100 (1, C) | 30* | 98.2* | $0.238* | 6.0* |
| Example 8: b-LLDPE/8007F-100/EVA/8007F-100/b-LLDPE (5, C) | 30† | 94.8† | $0.215† | 6.0† |
| Example 9: b-LLDPE + 30% 8007F-100 (1, C) | 30* | 98.0* | $0.218* | 6.0* |
| Control C: LDPE/Ionomer/LDPE (3, C) | 0 | 93.9 | $0.232 | 6.0 |
| Control D: LDPE/Ionomer/LDPE (3, C) | 0 | 88.7 | $0.464 | 12.0 |
| Control E: rPP/LLDPE + LDPE/rPP (5, C) | 0 | 91.5 | $0.172 | 6.0 |
| Control F: PE/tie/PA/tie/PE (5, B) | 0 | 91.3 | $0.243 | 5.9 |

*Example 1, 3 And 7 COCE-LLDPE Films Exhibit Almost No Shrinkage Or Snap-Back
**Downgauging Does Not Compromise Retained Volume
†Retained Volume May Be Reduced By LDPE

TABLE 26

Crush resistance.

| Film Description | TOPAS® COCE (%) | Crush Resistance (Deflection) @ 1.9 lb$_f$ mm | Material Cost ($/MSI) | Gauge (mil) |
|---|---|---|---|---|
| Control A: 100% Octene LLDPE | 0 | 26.9 | $0.175 | 6.0 |
| Control B: 100% butene LLDPE | 0 | 25.1 | $0.147 | 6.0 |
| Example 1: o-LLDPE + 15% 8007F-100 (1, C) | 15* | 23.2* | $0.206* | 6.0* |
| Example 2: h-m-LLDPE + LDPE + 12% 9506 + 3% 6013 (1, C) | 15 | 26.8 | $0.170 | 4.7 |
| Example 3: o-LLDPE + 20% 8007F-100 (1, C) | 20* | 19.5* | $0.217* | 6.0* |
| Example 4: m-h-LLDPE + LDPE + 9506 Discrete (7, B) | 24** | 24.7** | $0.190** | 4.7** |
| Example 5: m-h-LLDPE + LDPE + 9506/5013 Discrete (7, B) | 25 | 13.8 | $0.245 | 6.0 |

TABLE 26-continued

Crush resistance.

| Film Description | TOPAS® COCE (%) | Crush Resistance (Deflection) @ 1.9 lb$_f$ mm | Material Cost ($/MSI) | Gauge (mil) |
|---|---|---|---|---|
| Example 6: m-h-LLDPE + LDPE + 9506/5013 Discrete (7, B) | 25 | 27.5 | $0.163 | 4.0 |
| Example 7: o-LLDPE + 30% 8007F-100 (1, C) | 30* | 15.6* | $0.238* | 6.0* |
| Example 8: b-LLDPE/8007F-100/EVA/8007F-100/b-LLDPE (5, C) | 30 | 21.6 | $0.215 | 6.0 |
| Example 9: b-LLDPE + 30% 8007F-100 (1, C) | 30† | 11.8† | $0.218† | 6.0† |
| Control C: LDPE/Ionomer/LDPE (3, C) | 0** | 24.6** | $0.232** | 6.0** |
| Control D: LDPE/Ionomer/LDPE (3, C) | 0† | 11.8† | $0.464† | 12.0† |
| Control E: rPP/LLDPE + LDPE/rPP (5, C) | 0** | 24.3** | $0.172** | 6.0** |
| Control F: PE/tie/PA/tie/PE (5, B) | 0 | 21.7 | $0.243 | 5.9 |

*COCE Improves Crush Resistance of Formed Trays
**Downgauged COCE Films Match Performance of Non-COCE Films
†Downgauged COCE Films Offers Similar Protection, But At Less Cost

TABLE 27

Corner puncture resistance.

| Film Description | TOPAS® COCE (%) | Formed Corner Puncture (lb) | Corner Puncture Retention (%) | Material Cost ($/MSI) | Formed Corner Gauge (mil) | Gauge (mil) |
|---|---|---|---|---|---|---|
| Control A: 100% Octene LLDPE | 0 | 5.3 | 80.8 | $0.175 | 2.4 | 6.0 |
| Control B: 100% butene LLDPE | 0 | 5.7 | 85.2 | $0.147 | 1.6 | 6.0 |
| Example 1: o-LLDPE + 15% 8007F-100 (1, C) | 15* | 5.7* | 82.9* | $0.206* | 2.0* | 6.0* |
| Example 2: h-m-LLDPE + LDPE + 12% 9506 + 3% 6013 (1, C) | 15 | 6.2 | 69.7 | $0.170 | 1.1 | 4.7 |
| Example 3: o-LLDPE + 20% 8007F-100 (1, C) | 20* | 6.2* | 79.0* | $0.217* | 2.0* | 6.0* |
| Example 4: m-h-LLDPE + LDPE + 9506 Discrete (7, B) | 24 | 6.1 | 77.1 | $0.190 | 1.4 | 4.7 |
| Example 5: m-h-LLDPE + LDPE + 9506/5013 Discrete (7, B) | 25** | 8.2** | 78.8** | $0.245** | 3.1** | 6.0** |
| Example 6: m-h-LLDPE + LDPE + 9506/5013 Discrete (7, B) | 25† | 6.7† | 94.4† | $0.163† | 2.3† | 4.0† |
| Example 7: o-LLDPE + 30% 8007F-100 (1, C) | 30* | 8.5* | 96.4* | $0.238* | 2.0* | 6.0* |
| Example 8: b-LLDPE/8007F-100/EVA/8007F-100/b-LLDPE (5, C) | 30 | 5.9 | 64.0 | $0.215 | 1.6 | 6.0 |
| Example 9: b-LLDPE + 30% 8007F-100 (1, C) | 30** | 8.3** | 95.3** | $0.218** | 1.8** | 6.0** |
| Control C: LDPE/Ionomer/LDPE (3, C) | 0** | 8.3** | 81.6** | $0.232** | 1.8** | 6.0** |
| Control D: LDPE/Ionomer/LDPE (3, C) | 0 | 10.2 | 57.5 | $0.464 | 4.0 | 12.0 |
| Control E: rPP/LLDPE + LDPE/rPP (5, C) | 0 | 5.0 | 56.0 | $0.172 | 1.2 | 6.0 |
| Control F: PE/tie/PA/tie/PE (5, B) | 0 | 10.2 | 81.0 | $0.243 | 1.5 | 5.9 |

*Corner Puncture And Retention Improve With Addition Of COCE
**Films With 25 to 30 Percent COCE Are As Puncture Resistant As Control C and D
†COCE Films Can Be Downgauged Without Sacrificing Puncture Resistance

TABLE 28

Bottom puncture resistance.

| Film Description | TOPAS® COCE (%) | Formed Bottom Puncture (lb) | Bottom Puncture Retention (%) | Material Cost ($/MSI) | Formed Bottom Gauge (mil) | Gauge (mil) |
|---|---|---|---|---|---|---|
| Control A: 100% Octene LLDPE | 0 | 6.1 | 93.5 | $0.175 | 3.0 | 6.0 |
| Control B: 100% butene LLDPE | 0 | 6.6 | 98.5 | $0.147 | 3.1 | 6.0 |
| Example 1: o-LLDPE + 15% 8007F-100 (1, C) | 15* | 7.6* | 110.4* | $0.206* | 3.6* | 6.0* |
| Example 2: h-m-LLDPE + LDPE + 12% 9506 + 3% 6013 (1, C) | 15 | 8.2 | 92.7 | $0.170 | 2.9 | 4.7 |
| Example 3: o-LLDPE + 20% 8007F-100 (1, C) | 20* | 8.6* | 108.2* | $0.217* | 4.0* | 6.0* |
| Example 4: m-h-LLDPE + LDPE + 9506 Discrete (7, B) | 24 | 6.8 | 85.9 | $0.190 | 2.6 | 4.7 |
| Example 5: m-h-LLDPE + LDPE + 9506/5013 Discrete (7, B) | 25 | 8.6 | 82.7 | $0.245 | 3.0 | 6.0 |
| Example 6: m-h-LLDPE + LDPE + 9506/5013 Discrete (7, B) | 25 | 6.7 | 94.4 | $0.163 | 2.1 | 4.0 |
| Example 7: o-LLDPE + 30% 8007F-100 (1, C) | 30** | 11.7** | 133.0** | $0.238** | 4.4** | 6.0** |
| Example 8: b-LLDPE/8007F-100/EVA/8007F-100/b-LLDPE (5, C) | 30 | 7.6 | 82.2 | $0.215 | 3.4 | 6.0 |
| Example 9: b-LLDPE + 30% 8007F-100 (1, C) | 30* | 11.1* | 127.6* | $0.218* | 3.9* | 6.0* |
| Control C: LDPE/Ionomer/LDPE (3, C) | 0** | 10.5** | 102.7** | $0.232** | 3.9** | 6.0** |

TABLE 28-continued

Bottom puncture resistance.

| Film Description | TOPAS ® COCE (%) | Formed Bottom Punture (lb) | Bottom Puncture Retention (%) | Material Cost ($/MSI) | Formed Bottom Gauge (mil) | Gauge (mil) |
|---|---|---|---|---|---|---|
| Control D: LDPE/Ionomer/LDPE (3, C) | 0 | 13.1 | 74.0 | $0.464 | 7.0 | 12.0 |
| Control E: rPP/LLDPE + LDPE/rPP (5, C) | 0 | 8.5 | 94.8 | $0.172 | 3.0 | 6.0 |
| Control F: PE/tie/PA/tie/PE (5, B) | 0** | 12.5** | 99.2** | $0.243** | 3.3** | 5.9** |

*Bottom Puncture, Gauge And Retention Improve With COCE Addition
**Bottom Puncture Resistance Of Example 7 Monolayer Film Is Similar To Control C, D, and F Containing Ionomer and Nylon Containing Forming Films As will be appreciated from the data above, stiffness enhancement is one of the hallmark benefits of blending with cycloolefin/ethylene copolymer. Table 17 shows the addition of 15 to 30 weight percent cycloolefin/ethylene copolymer to octene LLDPE more than doubled MD/TD elastic modulus of the LLDPE (See Examples 1, 3, and 7). A butene LLDPE with 30 weight percent cycloolefin/ethylene copolymer, Example 9 had slightly higher MD/TD modulus. Table 17 also reflects the five and seven-layer cycloolefin/ethylene copolymer films had good MD/TD stiffness balance. The five layer films are cast and the seven-layer are blown, suggesting this behavior is independent of processing. Many cycloolefin/ethylene copolymer containing monolayer films are less balanced, with much less stiffness enhancement occurring in the transverse direction. Examples 5 and 6 have very high balanced MD/TD modulus. Downgauging of these films from 152 to 102 micron (6 to 4-mil) did not diminish stiffness, enabling material savings opportunities. Most Control samples, non-cycloolefin/ethylene copolymer flexible forming films, are soft and less stiff. The improved stiffness provided by cycloolefin/ethylene copolymer makes the package look more rigid.

Table 18 shows that the addition of 15 to 30 weight percent cycloolefin/ethylene copolymer to octene LLDPE modestly increased and balanced tensile strength in MD and TD. Cycloolefin/ethylene copolymer-containing forming films are generally stronger than Controls C and D. Downgauging cycloolefin/ethylene copolymer forming films does not compromise tensile strength. However, Examples 4, 5, 6, and 8 either mono or multilayer, tend to have lower tensile strength. These values depend on the degree of compatibility among the polymers. Compatibility is influenced by the bulk properties of the blending polymers, including but not limited to density and molecular weight.

Examples 1, 3, and 7 from Table 19 suggest that LLDPE-cycloolefin/ethylene copolymer films are more ductile than one would expect from adding a brittle cycloolefin/ethylene copolymer to the polymer backbone. Addition of 15% cyclic olefin into the polymer only slightly reduces the TD % and MD %. Doubling the cyclic olefin % to 30 reduces the MD and TD % by a third at most. This finding is significant given that cycloolefin/ethylene copolymer incorporation also enables the forming film to retain most of its pre-formed toughness (see Table 27 and 28).

Small gauge variation, as measured by CV, is desirable for thermoformed cavities. Gauge variation of cycloolefin/ethylene copolymer-containing forming films, formed under the best conditions, "optimum forming CV," did not show much dependency on cycloolefin/ethylene copolymer content (See Table 20). Nonetheless most of the Example films formed well and compared favorably to the Control semi-crystalline, non-cycloolefin/ethylene copolymer films. However, it was apparent that gauge variation decreases as cycloolefin/ethylene copolymer content increases when all forming conditions, "overall design CV", are considered. Example 7 a monolayer LLDPE-cycloolefin/ethylene copolymer with 30 percent cycloolefin/ethylene copolymer has very low gauge variation, close to that of ionomer forming films (Control C and D). Large difference in gauge variation between "optimum" and "all" forming conditions are expected. Most Control non-cycloolefin/ethylene copolymer forming films illustrate this point. On the other hand, most cycloolefin/ethylene copolymer-containing forming films have a rather narrow difference between "optimal" and "overall design" forming conditions. This difference diminishes at higher cycloolefin/ethylene copolymer content, suggesting cycloolefin/ethylene copolymer gives forming films a very broad forming window.

Table 21 summarizes the Elmendorf tear values. Most of the cycloolefin/ethylene copolymer Example film Elmendorf Tear values reported in Table 21 are similar to those reported for Controls C and F. Examples 1, 3, and 7 of Table 21 show that the addition of cycloolefin/ethylene copolymer reduces the resistance to tear propagation.

Low haze and high gloss can be achieved with cycloolefin/ethylene copolymer film (Table 22). Compatibility of cycloolefin/ethylene copolymer with LLDPE and LDPE will influence haze in monolayer films. Domain size of cycloolefin/ethylene copolymer phase compatible with PE matrix is usually very small and would refract less light, reducing haze. Example 2, a LLDPE-cycloolefin/ethylene copolymer-LDPE blend monolayer film has haze of 6.7 percent. More optimization through coextrusion is possible. Lower haze is possible with multilayer films, provided the rheological properties of the materials are close enough to eliminate interlayer instabilities. Addition of skin layers to monolayer films exhibiting high external haze is another approach. Example 8, a five layer 152-micron (6-mil) cast film consisting of butene LLDPE/EVA/cycloolefin/ethylene copolymer/EVA/butene LLDPE with 30 weight percent cycloolefin/ethylene copolymer has haze of less than 8 percent. Low haze values are usually paired with high gloss values, particularly with multilayer structures. The Optics of cycloolefin/ethylene copolymer-containing films are very competitive with Control C and D (ionomers) and Control F (nylon film).

Table 23 and 24 show the puncture resistance increases in monolayer films with the addition of cycloolefin/ethylene copolymer. LDPE appears to reduce toughness and puncture resistance.

Amorphous materials can be thermoformed with less residual stress than semi-crystalline resins. Retained volume is nearly 100 percent for monolayer cycloolefin/ethylene copolymer-LLDPE films with cycloolefin/ethylene copolymer content between 15 and 30 weight percent (Table 25). This result reflects the amorphous nature of cycloolefin/ethylene copolymer which is imparted into the films, even at relatively small amount. Less stress means less post-form shrinkage or snap-back, giving the flexible package the appearance of a rigid one. Film structures with high LDPE content tend to have lower retained volume. Formed cavities from other semi-crystalline materials, such as nylon and PP, usually suffer some loss in volume.

To access crush resistance (Table 26) of the formed cavities, displacement or deflection required to reach a predefined load of 8.45 Newton (1.9 lbf) is measured between two parallel plates. For 152 micron (6-mil) monolayer cast films, the addition of cycloolefin/ethylene copolymer from 15 to 30 weight percent reduces the deflection from 23.2 to 15.6 mm (see Example 1 and 7). Cycloolefin/ethylene copolymer-containing packages are more effective at resisting crushing forces than non-cycloolefin/ethylene copolymer ones. In fact, Control D, a 304 micron (12-mil) ionomeric forming film offers the same protection as Example 9, a 152 micron (6-mil) monolayer film with 30% cycloolefin/ethylene copolymer, but the latter provides a substantial material cost savings opportunity. Such benefits are achievable at thinner gauges. Example 4, a 119 micron (4.7-mil) multilayer film with 24 weight percent cycloolefin/ethylene copolymer has the same crush resistance as Control C, a 152 micron (6.0-mil) ionomeric film, but at less cost.

Corners are usually the thinnest part of the tray and more susceptible to puncture failures. Corners, created by the intersection of three planes, are usually the highest stress regions in the package. In Table 27, addition of 15 to 30 weight percent cycloolefin/ethylene copolymer into a monolayer o-LLDPE improves corner puncture resistance from 5.7 to 8.5 pounds (see Examples 1 and 7). Corner puncture retention for Examples 1 and 7, which is the ratio of corner to flat film puncture, improves from around 80 to 96 percent. This significant finding suggests cycloolefin/ethylene copolymer enables the forming film to retain most of its pre-formed toughness.

Mono or multilayer cycloolefin/ethylene copolymer-LLDPE films with between 25 and 30 weight percent cycloolefin/ethylene copolymer (Examples 5-9) are as tough as Control C and D (ionomeric films). Downgauging cycloolefin/ethylene copolymer forming films does not necessarily sacrifice puncture resistance because the corner thicknesses of these films are between 33 to over 50 percent of the original film thickness whereas non-cycloolefin/ethylene copolymer containing films are between 20 and 33 percent.

Bottom puncture (Table 28) is a measure of the puncture resistance of the formed cavity. The film gauge at the bottom is a close proxy to the average gauge for the formed tray. For monolayer cycloolefin/ethylene copolymer-LLDPE films (Examples 1, 3, 7 in Table 28), the addition of cycloolefin/ethylene copolymer, from 15 to 30 weight percent, improves formed bottom puncture resistance from 7.6 to 11.7 pounds. Puncture retention is the percentage of puncture strength of thermoformed film to that of unformed film. Bottom puncture retention surprisingly exceeds 100 percent in all 152 micron (6-mil) monolayer Example cycloolefin/-ethylene copolymer films. This indicates puncture resistance of the film improves upon forming, as much as 30 percent for the two monolayer films with 30 percent cycloolefin/ethylene copolymer. Cycloolefin/ethylene copolymer enables the film to biaxially stretch in a uniform manner during forming, improving toughness and tray integrity. This performance is similar to Controls C and D (ionomers) and Control F (nylon) formed trays, both of which have an excellent market reputation for toughness and durability.

Using materials and techniques described above, thermoformed articles with more depth of draw and higher areal draw ratios were made to further demonstrate the advantages of the thermoformed articles of this invention. Generally speaking, depth of draw is very simple material stretching parameter used in thermoforming. Depth of draw is simply defined as the distance or height between the top and bottom of the tool. By using a segmented variable depth tool, the depth of draw of the thermoformed trays was increased in 0.25-inch increments from 1.00 to 1.75-inches. By adding these depth segments to our forming tool, we increase the surface area of the formed tray. A more meaningful measure of material stretching is thus the areal draw ratio. This is a ratio of the surface area of the formed part to the available surface area of the unformed sheet. This available surface area is usually defined by the open perimeter of the forming tool. Areal draw ratio calculations can be rather complex, depending on the complexity of the formed cavity geometries. Details can be found in Throne's Handbook of Thermoforming (previously cited herein).

The effects of depth of draw on the formability and properties of three films are summarized in Tables 29, 30 and 31. Control A material is an atypical forming film, consisting of octene LLDPE. Control C material represents a preferred ionomeric commercial forming film. Example 7 material is a monolayer octane LLDPE film containing 30 weight percent COC. Areal draw ratio increases as a function of depth of draw. The films must stretch more to accommodate the increase in the surface area. For example, for an areal draw ratio of 2, the film must stretch two times its original unformed area to cover the area of the formed part. The greater Fthe areal draw ratio, the more demanding it is for the film to stretch and to form properly.

Volume retention measures the tendency for the formed material to shrink back in order to relieve internal stresses. As shown in Table 29, differences among Control A material, Control C material and Example 7 material are small, with Example 7 material and Control C material having identical retained volumes. This result suggests the addition of 30 weight percent COC to octene LLDPE reduces the internal stress of the formed film and consequently reduces its tendency to shrink back after forming. At larger areal draw ratios, Example 7 material exhibits very high, near 100 percent, volume retention, indicating good dimensional stability and very little post forming shrinkage. Control C material could not be measured at 2.69 areal draw ratio because the formed cavity lacked adequate mechanical integrity; it was too soft and easily distorted.

The forming temperatures used for these films are summarized in Table 29. These are temperatures that have been identified to give very good forming results. Example 7 material was formed at 105° C., which is 25° C. about the 80° C. glass transition temperature of COC, and is consistent with established rules of thumb for selecting forming temperatures of amorphous polymers.

Table 30 summarizes the effects of areal draw ratio on material distribution in the formed trays. Stresses are usually not uniformly distributed because of complex tool geometry and non-uniform cooling of the sheet during forming. The coefficient of variation for the formed cavity gauge is influenced by both film construction and areal draw ratio (or depth of draw). As one may expect, Control A material showed the most gauge variation, 36 percent, and Control C material showed the least, 20 percent. The addition of 30% COC to octene LLDPE in Example 7 material showed a significant reduction in gauge variation versus Control A material, 26 versus 36 percent. Films are subjected to more stress during forming at higher areal draw ratios. An increase in areal draw ratio increased the gauge variation measured in all films. Modest increase in areal draw ratio for Control A material shows a large increase in gauge variability. This is typical of a material not suitable of thermoforming. Control C material, a good forming film, showed large, but acceptable increase in gauge variability. Example 7 material showed a significant reduction in variation versus Control A material, 33 versus 67 percent for 2.1 and 52 versus 81 percent for 2.39 areal draw ratios. COC does significantly reduce gauge variation of LLDPE.

Excessive variation in the wall thickness in formed articles is not desirable. Thin areas in the formed part suggest weakness and lack of integrity. The average thickness of the formed walls and average thickness of the formed corners is summarized in Table 30 for each film and areal draw ratio. All films measured between 5.45 and 5.65 mil prior to forming. At each areal draw ratio, the average formed wall and corner thickness of Example 7 material versus Control A material showed noticeable, if not significant improvement. Although Example 7 material did not meet or exceed the average gauge of Control C material, the difference between these two films decreased as the areal draw ratio increased. For example, the average formed wall gauge at 1.91 areal draw ratio for Example 7 material and Control C material was 2.40 and 3.30 mil respectively. However, at 2.69 areal draw ratio, this difference was 1.70 and 2.00 mil.

Puncture resistance of the formed trays is critical to the overall functionality of the package. In Table 31 puncture resistance and energy to break is measured on the bottom of the formed tray at each of the four areal draw ratios. At 1.9 areal draw ratio, Example 7 material shows superior puncture resistance to both Control A material and Control C material. Puncture energy of Example 7 material and Control C material are nearly the same. COC does bring durability and toughness to LLDPE forming films. At 2.1 areal draw ratio, Example 7 material outperforms Control A material and Control C material in both puncture resistance and puncture energy absorbed. This result occurred even though Example 7 material has the thinnest gauge. Example 7 material did not match the performance of Control C material at the 2.69 areal draw ratio. Nonetheless, the addition of 30 percent COC to LLDPE (Example 7 material versus Control A material) did show an enhancement of puncture resistance and energy absorbed across all areal draw ratios.

Although Example 7 material did not have as uniform gauge distribution as the ionomeric Control C material, the excellent volume retention and puncture resistance that can be imparted into LLDPE by the addition of 30 percent COC over a range of areal draw ratios. This clearly demonstrates the value of COC in creating a new and much improved forming film; a film that has more utility than traditional ionomeric based ones, especially in terms of stiffness, puncture resistance and volume retention.

TABLE 29

Depth of Draw: Volume Retention & Forming Temperature

| Film Description | Depth of Draw (inch) | TOPAS® COCE (%) | Areal Draw Ratio | Volume Retention (%) | Forming Temperature (° C.) |
|---|---|---|---|---|---|
| Control A: 100% Octene LLDPE | 1.00 | 0 | 1.91 | 92.1 | 100 |
| Control C: LDPE/Ionomer/LDPE (3, C)* | 1.00 | 0 | 1.91 | 94.8 | 90 |
| Example 7: o-LLDPE + 30% 8007F-100 (1, C)* | 1.00 | 30 | 1.91 | 94.8 | 105 |
| Control A: 100% Octene LLDPE | 1.25 | 0 | 2.10 | 93.5 | 100 |
| Control C: LDPE/Ionomer/LDPE (3, C)* | 1.25 | 0 | 2.10 | 82.6 | 90 |
| Example 7: o-LLDPE + 30% 8007F-100 (1, C)* | 1.25 | 30 | 2.10 | 96.4 | 105 |
| Control A: 100% Octene LLDPE | 1.50 | 0 | 2.39 | 93.3 | 100 |
| Control C: LDPE/Ionomer/LDPE (3, C)* | 1.50 | 0 | 2.39 | 95.3 | 90 |
| Example 7: o-LLDPE + 30% 8007F-100 (1, C)* | 1.50 | 30 | 2.39 | 96.9 | 105 |
| Control A: 100% Octene LLDPE | 1.75 | 0 | 2.69 | 90.5 | 100 |
| Control C: LDPE/Ionomer/LDPE (3, C)* | 1.75 | 0 | 2.69 | — | 90 |
| Example 7: o-LLDPE + 30% 8007F-100 (1, C)* | 1.75 | 30 | 2.69 | 98.8 | 105 |

*indicates number of layers, cast film

TABLE 30

Depth of Draw: Forming Gauge

| Film Description | Depth of Draw (inch) | TOPAS® COCE (%) | Formed Cavity Gauge Variation CV (%) | Areal Draw Ratio | Formed Wall Gauge (mil) | Formed Corner Gauge (mil) |
|---|---|---|---|---|---|---|
| Control A: 100% Octene LLDPE | 1.00 | 0 | 36.4 | 1.91 | 2.00 | 0.83 |
| Control C: LDPE/Ionomer/LDPE (3, C)* | 1.00 | 0 | 20.4 | 1.91 | 3.30 | 1.58 |
| Example 7: o-LLDPE + 30% 8007F-100 (1, C)* | 1.00 | 30 | 26.9 | 1.91 | 2.40 | 1.34 |
| Control A: 100% Octene LLDPE | 1.25 | 0 | 67.9 | 2.10 | 1.80 | 0.70 |
| Control C: LDPE/Ionomer/LDPE (3, C)* | 1.25 | 0 | 23.1 | 2.10 | 2.70 | 1.30 |
| Example 7: o-LLDPE + 30% 8007F-100 (1, C)* | 1.25 | 30 | 33.4 | 2.10 | 2.00 | 1.00 |
| Control A: 100% Octene LLDPE | 1.50 | 0 | 81.9 | 2.39 | 1.30 | 0.60 |
| Control C: LDPE/Ionomer/LDPE (3, C)* | 1.50 | 0 | 28.6 | 2.39 | 2.30 | 1.10 |
| Example 7: o-LLDPE + 30% 8007F-100 (1, C)* | 1.50 | 30 | 52.8 | 2.39 | 1.90 | 0.70 |
| Control A: 100% Octene LLDPE | 1.75 | 0 | 95.5 | 2.69 | 1.40 | 0.30 |
| Control C: LDPE/Ionomer/LDPE (3, C)* | 1.75 | 0 | 42.8 | 2.69 | 2.00 | 0.90 |
| Example 7: o-LLDPE + 30% 8007F-100 (1, C)* | 1.75 | 30 | 64.0 | 2.69 | 1.70 | 0.50 |

*indicates number of layers, cast film

TABLE 31

Depth of Draw: Formed Bottom Puncture Resistance

| Film Description | Depth of Draw (inch) | TOPAS ® COCE (%) | Areal Draw Ratio | Formed Bottom Gauge (mil) | Formed Bottom Puncture (lb) | Formed Bottom Energy to Break (lb-in) |
|---|---|---|---|---|---|---|
| Control A: 100% Octene LLDPE | 1.00 | 0 | 1.91 | 3.10 | 6.29 | 2.79 |
| Control C: LDPE/Ionomer/LDPE (3, C)* | 1.00 | 0 | 1.91 | 3.60 | 8.04 | 3.59 |
| Example 7: o-LLDPE + 30% 8007F-100 (1, C)* | 1.00 | 30 | 1.91 | 3.30 | 9.52 | 3.49 |
| Control A: 100% Octene LLDPE | 1.25 | 0 | 2.10 | 2.60 | 3.93 | 1.62 |
| Control C: LDPE/Ionomer/LDPE (3, C)* | 1.25 | 0 | 2.10 | 3.00 | 6.76 | 2.50 |
| Example 7: o-LLDPE + 30% 8007F-100 (1, C)* | 1.25 | 30 | 2.10 | 2.50 | 7.41 | 2.56 |
| Control A: 100% Octene LLDPE | 1.50 | 0 | 2.39 | 1.60 | 4.67 | 1.86 |
| Control C: LDPE/Ionomer/LDPE (3, C)* | 1.50 | 0 | 2.39 | 2.70 | 6.16 | 2.45 |
| Example 7: o-LLDPE + 30% 8007F-100 (1, C)* | 1.50 | 30 | 2.39 | 1.70 | 6.27 | 1.92 |
| Control A: 100% Octene LLDPE | 1.75 | 0 | 2.69 | 0.90 | 3.92 | 1.25 |
| Control C: LDPE/Ionomer/LDPE (3, C)* | 1.75 | 0 | 2.69 | 2.10 | 5.36 | 1.94 |
| Example 7: o-LLDPE + 30% 8007F-100 (1, C)* | 1.75 | 30 | 2.69 | 1.70 | 4.26 | 1.48 |

*indicates number of layers, cast film

In view of the foregoing discussion, relevant knowledge in the art and references discussed above in connection with the Background and Detailed Description, the disclosures of which are all incorporated herein by reference, further description is deemed unnecessary.

What is claimed is:

1. A thermoformed article prepared from a sheet including linear low density polyethylene (LLDPE) and cycloolefin/ethylene copolymer, the cycloolefin copolymer being present in an amount of from about 5 weight percent to about 45 weight percent based on the weight of the sheet,
the sheet having a thickness of from about 3 mils to about 20 mils and exhibiting a relative machine direction (MD) modulus of at least 2 as compared to the LLDPE in the sheet as well as a relative MD elongation of greater than 0.5 as compared with the LLDPE in the sheet, wherein the relative MD modulus and the relative MD elongation as compared to the LLDPE in the sheet refers to the ratio of MD modulus of the sheet or MD elongation of the sheet to that of another sheet made exclusively from the LLDPE in the sheet and having the same geometry and which is made by the same process,
the thermoformed article being further characterized by having an areal draw ratio of at least 1.5 with respect to the sheet from which it is formed, said article defining a thermoformed cavity having an average thermoformed cavity thickness corresponding to the product of the initial thickness of the film prior to thermoforming and the reciprocal of the of the areal draw ratio.

2. The thermoformed article according to claim 1, wherein the thermoformed article has an areal draw ratio of at least 2.5 with respect to the sheet from which it is formed.

3. The thermoformed article according to claim 1, wherein the article is characterized by an areal draw ratio of from 1.5 to 5 with respect to the sheet from which it is formed.

4. The thermoformed article according to claim 1, wherein the sheet has a cycloolefin/ethylene copolymer content of from 10 weight percent to 40 weight percent.

5. The thermoformed article according to claim 1, wherein the sheet has a cycloolefin/ethylene copolymer content of from 15 weight percent to 35 weight percent.

6. The thermoformed article according to claim 1, wherein the sheet exhibits a relative MD modulus of at least 3 as compared to the LLDPE in the sheet.

7. The thermoformed article according to claim 1, wherein the sheet exhibits a relative MD modulus of at least 4 as compared to the LLDPE in the sheet.

8. The thermoformed article according to claim 1, wherein the thermoformed article exhibits a crush resistance of at least 2 relative to a thermoformed article formed of the LLDPE in the sheet having the same geometry and which is made in substantially the same way.

9. The thermoformed article according to claim 1, wherein the thermoformed article exhibits a bottom puncture retention of over 100%.

10. The thermoformed article according to claim 1, wherein the article exhibits a relative corner puncture resistance of at least 1.5 as compared with a thermoformed article formed of the LLDPE in the sheet having the same geometry and which is made in substantially the same way.

11. The thermoformed article according to claim 1, wherein the thermoformed article exhibits a retained volume of 98% or greater.

12. The thermoformed article according to claim 1, wherein the sheet has at least 3 discrete layers.

13. The thermoformed article according to claim 1, wherein the sheet has at least 5 discrete layers.

14. The thermoformed article according to claim 1, wherein the sheet is a multilayer, thermoformable sheet, having a thickness of from about 3 mils to about 20 mils, the multilayer sheet comprising at least one discrete layer which is more than 50% by weight LLDPE, at least one adjacent discrete layer which is more than 50% by weight Cycloolefin/ethylene copolymer, the sheet exhibiting a relative MD modulus of at least 2 as compared to the LLDPE in the sheet, wherein the relative MD modulus as compared to the LLDPE in the sheet refers to the ratio of MD modulus of the sheet to that of another sheet made exclusively from the LLDPE in the sheet and having the same geometry and which is made by the same process,
and the sheet comprises from about 2% to about 60% by weight of a third polymeric material.

15. The thermoformed article according to claim 14, wherein the sheet has a discrete oxygen barrier layer.

16. The thermoformed article according to claim 15, wherein the oxygen barrier layer consists essentially of EVOH.

17. The thermoformed article according to claim 15, wherein the oxygen barrier layer consists essentially of PVDC.

18. The thermoformed article according to claim 15, wherein the oxygen barrier layer consists essentially of a nylon polymer.

19. The thermoformed article according to claim 14, wherein the sheet is a coextruded sheet and further includes a discrete layer consisting essentially of a polymer selected from LDPE, MDPE and HDPE.

20. The thermoformed article according to claim 14, wherein the sheet is a coextruded sheet and further includes a polypropylene layer.

21. The thermoformed article according to claim 14,wherein the sheet is a coextruded sheet and further includes an ionomer layer.

22. The thermoformed article according to claim 1, wherein the Tg of cycloolefin/ethylene copolymer in the range of from 65° C. to 190° C.

23. The thermoformed article according to claim 1, wherein the Tg of cycloolefin/ethylene copolymer in the range of from 90° C. to 190° C.

* * * * *